(12) United States Patent
Bonacci et al.

(10) Patent No.: US 9,913,556 B2
(45) Date of Patent: Mar. 13, 2018

(54) MULTISIZE CAPSULE HANDLING WITH PARALLEL ACTUATION

(71) Applicant: NESTEC S.A., Vevey (CH)

(72) Inventors: Enzo Bonacci, Savigny (CH); Jean-Marc Flick, Pomy (CH)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 15/301,155

(22) PCT Filed: Apr. 7, 2015

(86) PCT No.: PCT/EP2015/057431
§ 371 (c)(1),
(2) Date: Sep. 30, 2016

(87) PCT Pub. No.: WO2015/155144
PCT Pub. Date: Oct. 15, 2015

(65) Prior Publication Data
US 2017/0007066 A1    Jan. 12, 2017

(30) Foreign Application Priority Data
Apr. 8, 2014    (EP) .................................. 14163793

(51) Int. Cl.
*A47J 31/36*    (2006.01)
*A47J 31/06*    (2006.01)

(52) U.S. Cl.
CPC ....... *A47J 31/3633* (2013.01); *A47J 31/0647* (2013.01); *A47J 31/3638* (2013.01); *A47J 31/3676* (2013.01)

(58) Field of Classification Search
CPC ............... A47J 31/3633; A47J 31/0647; A47J 31/3676; A47J 31/3638
See application file for complete search history.

(56) References Cited

U.S. PATENT DOCUMENTS

| 2004/0031394 A1* | 2/2004 | Yoakim ............... A47J 31/0668 99/279 |
| 2007/0104837 A1* | 5/2007 | Yoakim ............... A47J 31/0668 426/77 |
| 2013/0276638 A1* | 10/2013 | Kristlbauer ......... A47J 31/3633 99/295 |

FOREIGN PATENT DOCUMENTS

| EP | 1208782 | 5/2002 |
| WO | 2012093108 | 7/2012 |

* cited by examiner

*Primary Examiner* — Ryan J Walters
(74) *Attorney, Agent, or Firm* — K&L Gates LLP

(57) ABSTRACT

A machine (1) comprises a frame (1') and a capsule handling device (1") mounted in and/or on the frame (1'). The device (1") comprises: —a first part (10) that is movable relatively to the frame (1') from a transfer position for inserting and/or removing said capsule (2a,2b) to an extraction position for extracting such capsule and vice versa; —a second part (20) that has a capsule receptacle (21) delimiting a cavity (21') for receiving such capsule (2a,2b) and for forming an extraction chamber (21") with the first part (10) in its extraction position, the second part (10) comprising a first portion (21a) and a second portion (21b) that are relatively movable between a first relative position and a second relative position to change at least one dimension of the cavity (21') and of the extraction chamber (21"); —an actuator (30,300) connected to the first part (10) for driving the movable first part (10) between the transfer position and the extraction position. The actuator (30,300) is further connected to the second part (20) for driving the first and/or second portions (21a,21b) to relatively move the first and second portions (21a,21b) between their first and second relative positions.

12 Claims, 13 Drawing Sheets

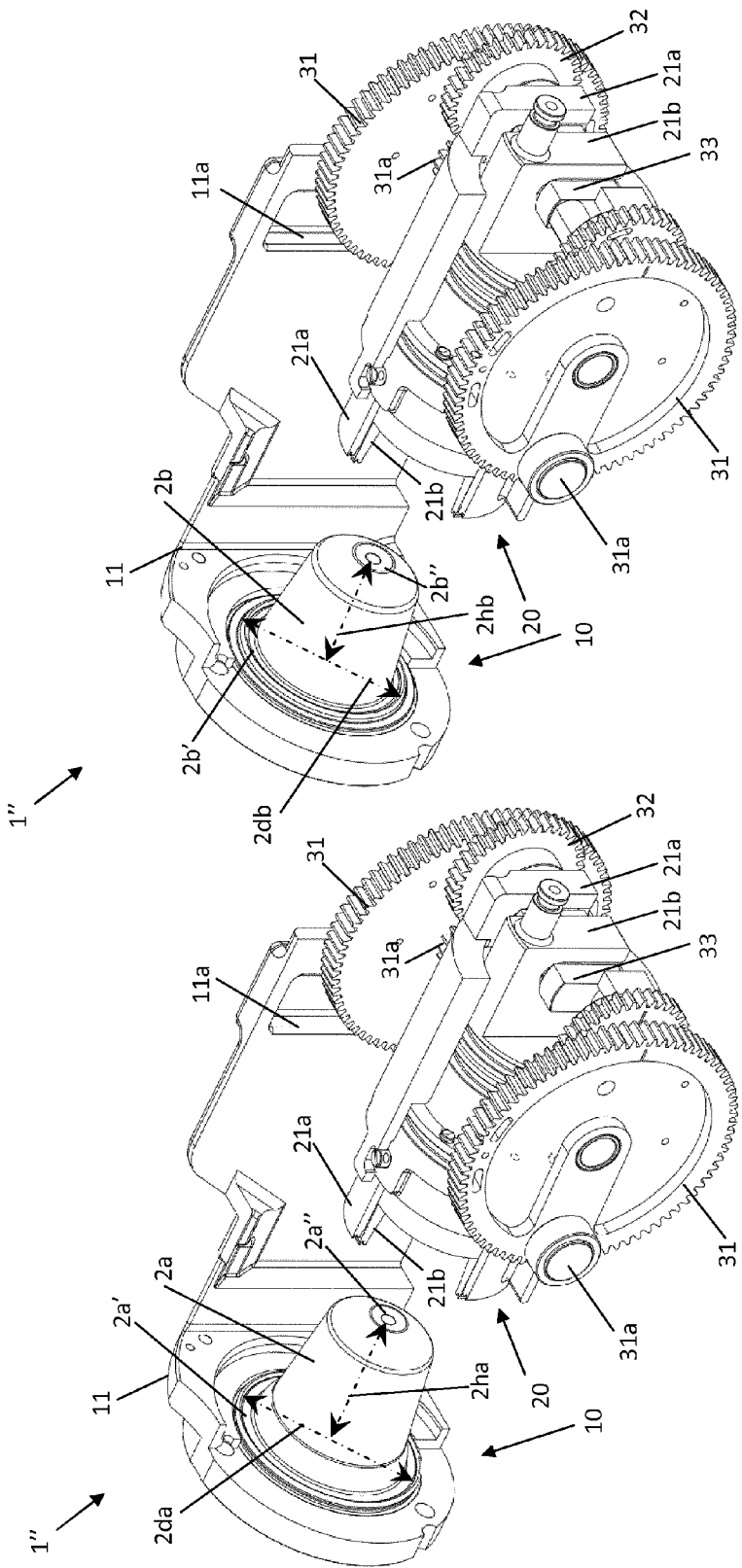

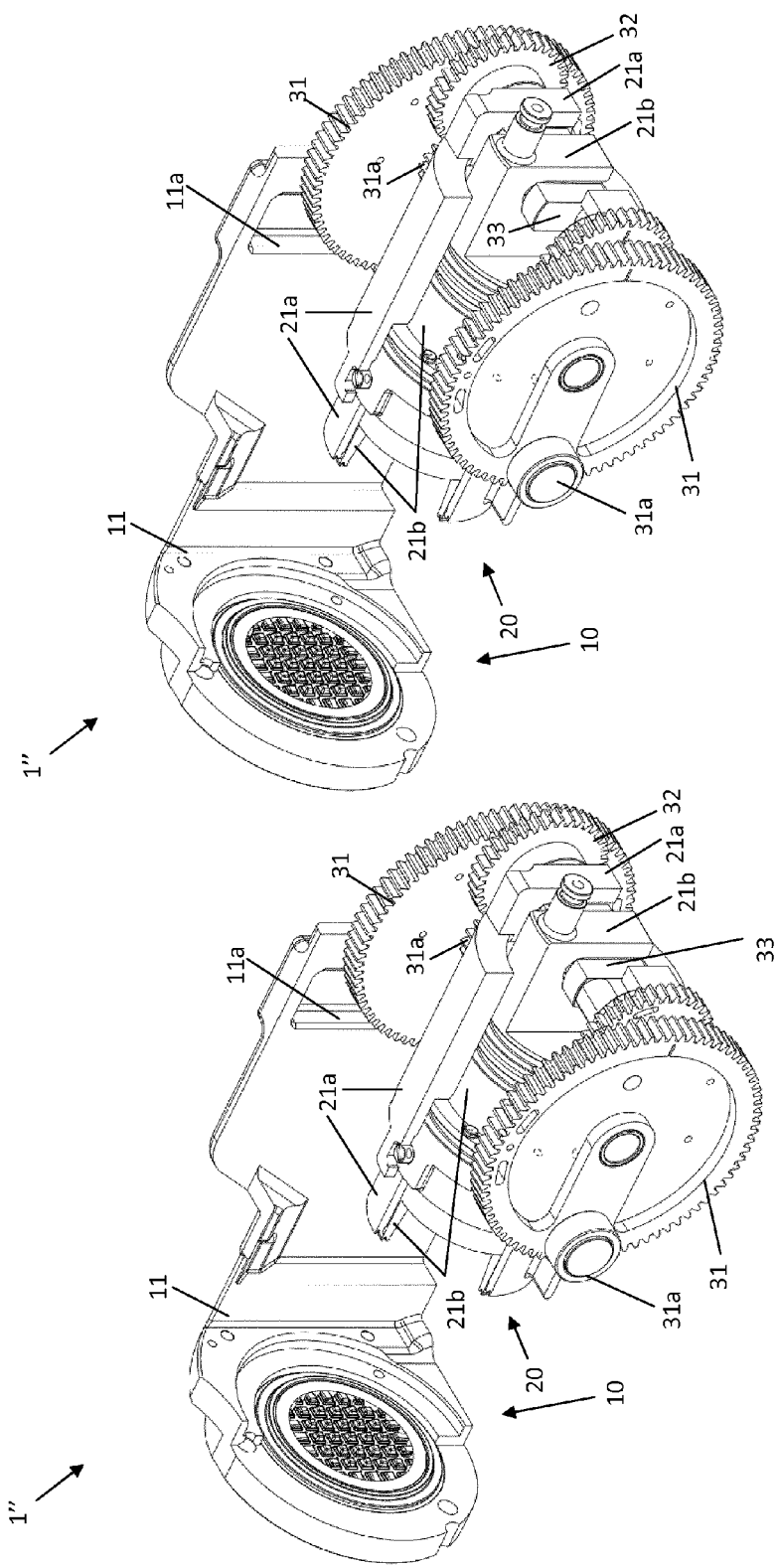

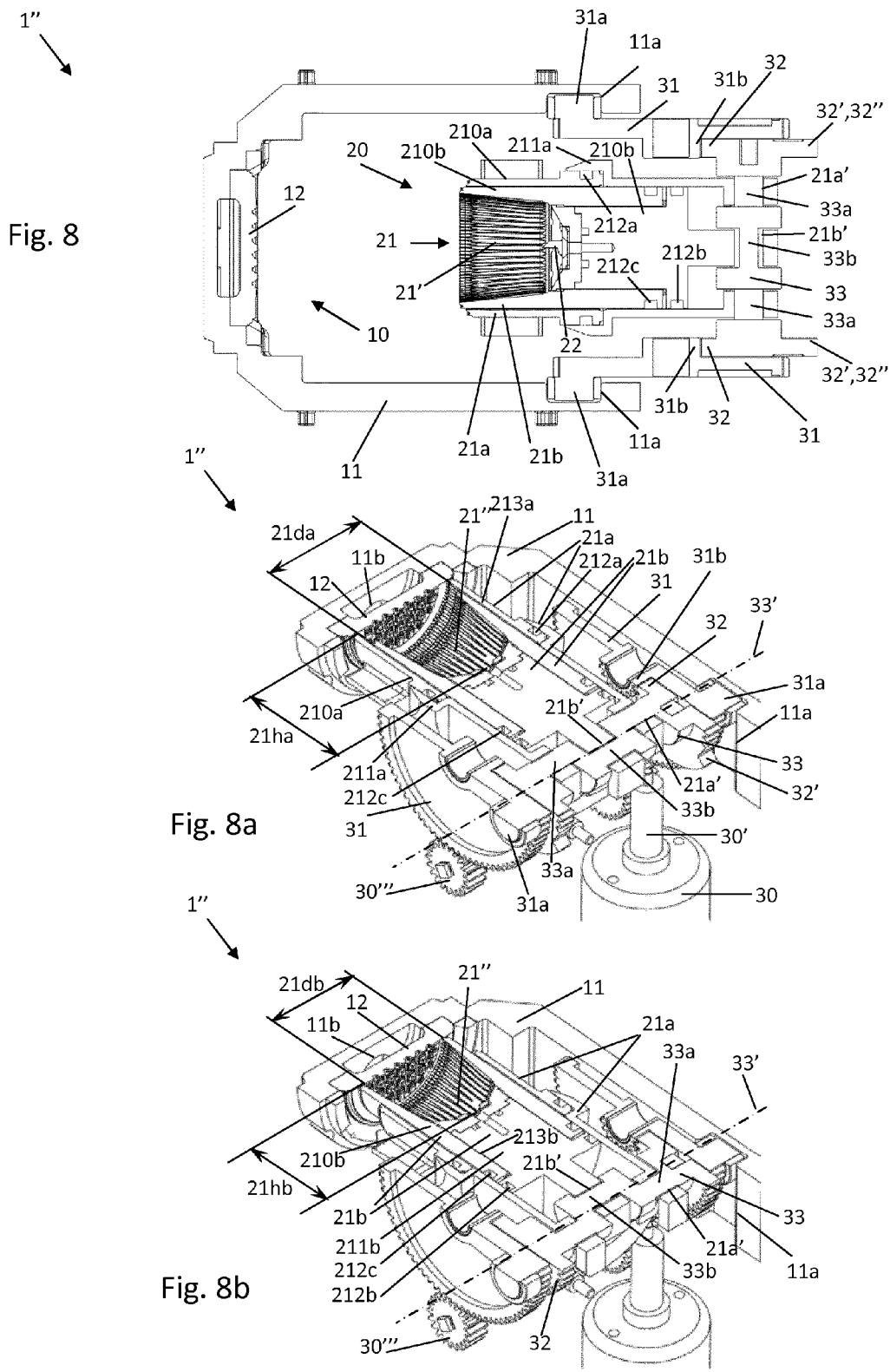

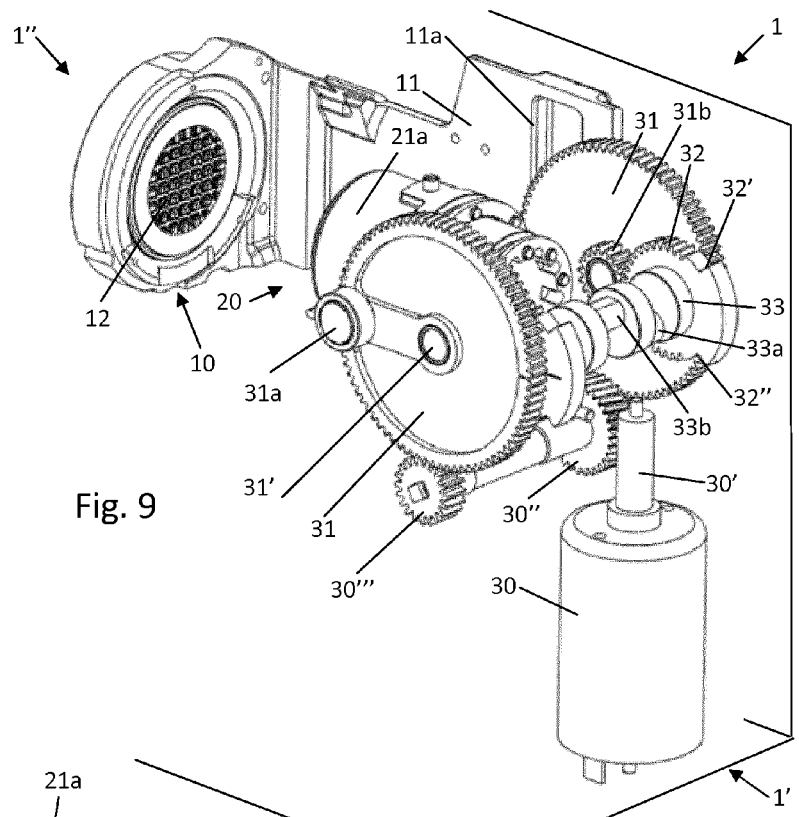
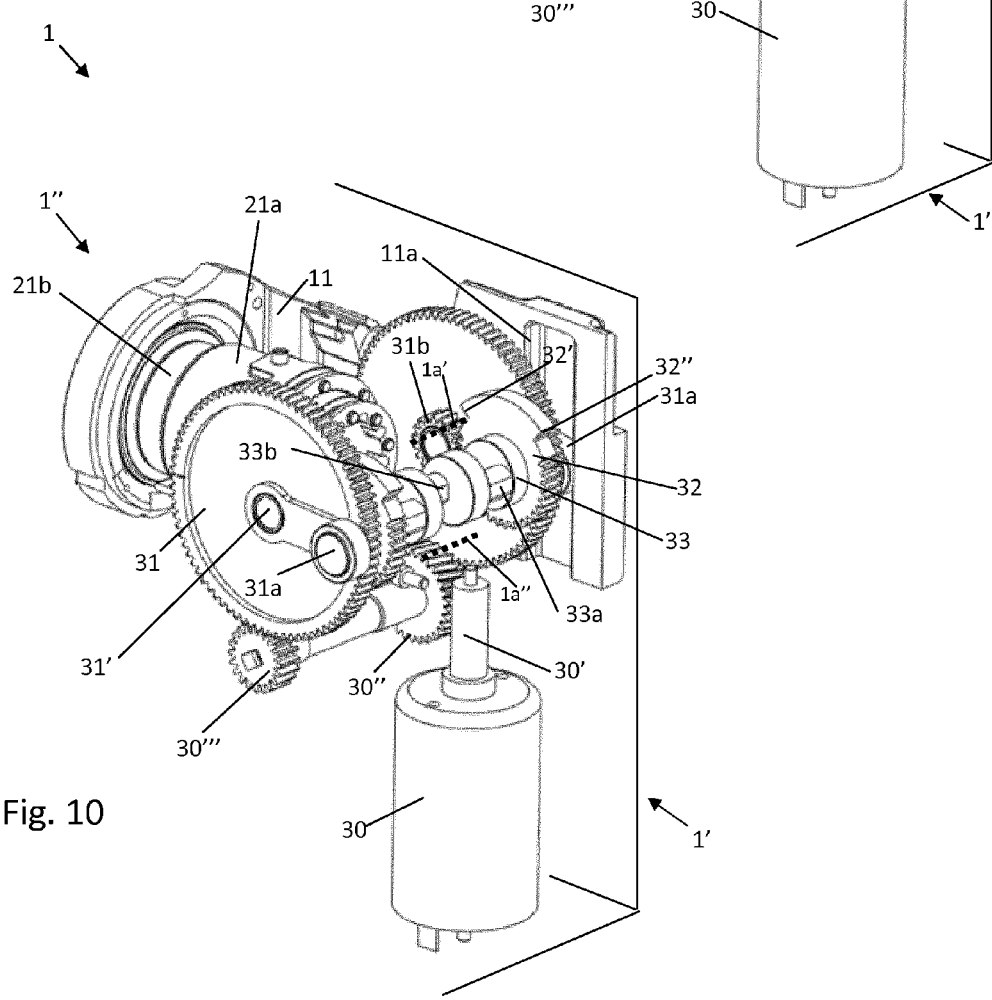

MULTISIZE CAPSULE HANDLING WITH PARALLEL ACTUATION

CROSS REFERENCE TO RELATED APPLICATIONS

The present application is a National Stage of International Application No. PCT/EP2015/057431, filed on Apr. 7, 2015, which claims priority to European Patent Application No. 14163793.4, filed Apr. 8, 2014, the entire contents of which are being incorporated herein by reference.

FIELD OF THE INVENTION

The field of the invention pertains to a device for handling capsules, in particular handling device for beverage machines using capsules of an ingredient of the beverage to be prepared. The invention also relates to a combination of the device and the capsule, to a method of handling the capsule with the device and to a use of a capsule for the device.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient, such as a flavouring ingredient, within an enclosing packaging of any material, in particular an airtight or air-permeable packaging, e.g. plastic, aluminium, recyclable and/or biodegradable packagings, and of any shape and structure, including soft pods or rigid cartridges containing the ingredient.

BACKGROUND ART

One problem encountered is the positioning of the capsule in the device and the closing of the latter around the capsule to perform the brewing process. The capsule usually has to be positioned by the user on a capsule support or in a housing, then the device is closed manually or automatically around the capsule.

It is important to correctly position the capsule so that the device closes correctly around the latter and a good seal is thus achieved to ensure good conditions of extraction. Bad positioning may damage the capsule, and thus affect the conditions of extraction. The loading of the capsule must also be easy, without trial and error as to the correct position of the capsule in the device. The loading must also be as rapid as possible and not require excessive manipulations. Hence, devices exist that propose the insertion of the capsule in a vertical plane and the movement of the extraction or infusion parts along a horizontal plane around the capsule. Such systems have the advantages of allowing a loading from the top piggy-bank fashion, and makes for rapid loading. The positioning of the capsule is then taken over by the movement of a movable part that pushes the capsule against another part such as a water heater. However, these devices are complex to produce and are not suitable for low-cost and therefore entry-level coffee machines for the consumer market. They are therefore usually intended for the business market such as restaurants, bars or communities. For example, patent application WO 98/47418 relates to a device for the extraction of pre-measured inserts in which the inserts are inserted vertically and are extracted horizontally. The disadvantage of this device is that it comprises two movable parts for the extraction, which makes the mechanical principle more complicated.

WO 2005/004683 relates to a capsule brewing device comprising: a first part; a second part that can be moved relative to the first part; a housing for the capsule and defining, in a closed position of the movable part against the fixed part, an extraction position of the capsule along an axis in the housing; an insertion and positioning part comprising means for guiding the capsule arranged so as to insert the capsule by gravity and position such capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The capsule is passed through the external housing to the infusion chamber via a rigid capsule feed channel and then the capsule is transferred into the infusion chamber by an external bushing on the movable rear part of the brewing unit which is provided with a cam-like path for moving the rear part. This arrangement involves several problems. The capsule must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the capsule, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee capsule into the machine. The drawer is movable between an open and a closed position and has two capsule half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 7,131,369, US 2005/0106288, US 2006/0102008, WO 2005/002405, WO 2005/016093, WO 2006/005756, WO 2006/066626, WO 2007/135136 and EP2013180164.9, EP2013180165.6 and EP2013180166.4.

Devices arranged to handle ingredient capsules of different sizes are disclosed in EP 1 208 782 and in WO 2012/123440. Further devices for handling capsules of different sizes are disclosed in PCT/EP13/064001, PCT/EP13/064003, PCT/EP13/070756, PCT/EP13/070780, PCT/EP13/070866, PCT/EP13/071453, PCT/EP13/077272, EP2013196040.3, EP2013196041.1 and EP2013196042.9.

There is still a need to provide a device for handling reliably capsules, e.g. capsules of different sizes.

SUMMARY OF THE INVENTION

It is an object of the present invention to provide a machine for handling capsules, e.g. ingredient capsules to prepare beverages.

In particular, the invention relates to a machine comprising a frame, such as a frame supporting a control unit and/or a machine's fluid circuit.

The control unit typically includes a controller or processor and/or a printed circuit board and/or and electric power management and/or a user-interface. The machine's fluid circuit may include one or more fluid conduits, a water source, e.g. a tank and/or connector to the city water distribution, a pump and a thermal conditioner such as a heater and/or a cooler. The control unit is typically arranged to control the machine's fluid circuit and can be connected to a pump, a thermal conditioner, a sensors such as a temperature sensor, a flowmeter, a pressure sensor, a level sensor (e.g. in a tank). When present, a motor is typically connected to the control unit. The control unit may also be connected to one or more position and/or motion sensors associated with any movable part of the machine, for instance of the capsule handling device.

Examples of fluid circuits are disclosed in WO 2009/074550 and in WO 2009/130099.

A suitable thermal conditioner may include a heater and/or a cooler such as a heater that is a thermoblock or an on demand heater (ODH), for instance an ODH type disclosed in EP 1 253 844, EP 1 380 243 and EP 1 809 151.

Suitable control unit configurations and connections are for example disclosed in WO 2009/043851 and WO 2009/043865.

The machine further comprises a capsule handling device mounted in and/or on the frame.

For instance, the device has an outlet for dispensing an extract of a capsule handled by the device. The device may include a fluid inlet connected to a machine's fluid circuit for circulating a fluid into such capsule.

The capsule handling device comprises:
a first part that is movable relatively to the frame from a transfer position for inserting and/or removing such capsule to an extraction position for extracting such capsule and vice versa;
a second part that has a capsule receptacle delimiting a cavity for receiving such capsule and for forming an extraction chamber with the first part in its extraction position, the second part comprising a first portion and a second portion that are relatively movable between a first relative position and a second relative position to change at least one dimension of the cavity and of the extraction chamber; and
an actuator, such as a motor or a handle, connected to the first part for driving the movable first part between the transfer position and the extraction position, for instance an actuator that is fixed in or to the frame.

In the context of the present invention, the "first part" and the "second part" may each refer to a single component typically assembling different functions, e.g. mechanical guiding function, mechanical holding function, mechanical piercing function, flow function, pressure function, etc. . . . , and/or refer to a plurality of components associating the desired function(s). The first part of the handling device is movable relatively to the second part and relatively to the frame, e.g. a stationary structure. The first part can be arranged to move in a direction, e.g. an arched and/or linear direction.

Examples of suitable motorized actuators are disclosed in EP 1767129, WO 2012/025258, WO 2012/025259 and WO 2013/127476. Example of suitable handles are disclosed in WO 2005/004683, WO2007/135136 and WO 2009/043630.

The handling device may include or delimit or be associated with a capsule feed channel, e.g. a chimney, for guiding the capsule, e.g. guiding the capsule by gravity, to inbetween the first and second parts in the transfer position and immobilize the capsule therebetween to then form the extraction chamber for extracting the capsule. Examples of such capsule feed channels and immobilization systems are disclosed in EP2013196041 and EP2013196042.

Upon extraction, the capsule can be removed from the capsule handling device by using a suitable capsule remover, e.g. as disclosed in EP2013196040.

Optionally, the first part has a support with an outlet for letting out an extract of the capsule e.g. via or along an opening device, such as via an opening plate. Such outlet may be arranged for dispensing beverage to a user, e.g. to an area for placing a user-cup or a user-mug. The dispensing area may be delimited at the bottom by a support surface for holding a user cup or mug. Such support surfaces are well known in the art, e.g. as disclosed in EP 1 867 260 and WO 2009/074557.

Optionally, the second part has an inlet for letting a fluid into the chamber to the capsule, e.g. via or along an opening device such as along one or more piercing elements in the cavity.

When closed capsules are used, first and second parts may include a capsule opener such as piercing elements, e.g. blades, and/or a tearing tool, e.g. an opening plate, for example with a tearing profile, for instance as known from Nespresso™ machines. See for example EP 0 512 468, EP 0 512 470, PCT/EP2013/073530, EP2013180164.9 and EP2013180166.4 and EP2013180165.6.

Optionally, at least one of the first and second portions comprises a base and a dimensional adjuster movably mounted to the base, such as an anti-backlash arrangement for urging the first and second parts together and/or against the capsule e.g. for sealing. For instance, the dimensional adjuster is actuated hydraulically e.g. via a hydraulic circuit that comprises a fluid passage and/or one or more sealing elements such as a hydraulic circuit that is connected to the machine's fluid circuit e.g. to the fluid inlet of the handling device. Examples of such dimensional adjusters are disclosed in WO 2008/037642.

In accordance with the invention, the actuator is further connected to the second part for driving the first and/or second portions to relatively move the first and second portions between their first and second relative positions. Optionally, the actuator drives the first part and the first and second portions:
  simultaneously; or
  sequentially; or
  partly simultaneously and partly sequentially.

Hence, a single actuator, e.g. a single motor or a single handle, may actuate the first part between the transfer and the extraction position as well as the first and second portions of the second part between their first and second relative positions.

In a particular embodiment, the device is arranged for handling capsules containing at least one ingredient e.g. to prepare a beverage from such ingredient in the beverage machine. For instance, the machine is a coffee, tea, chocolate, cacao, milk or soup preparation machine. The machine may be arranged for preparing within the extraction chamber a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . . . For example, a coffee machine may be configured for dispensing espressos, e.g. an adjustable volume of 20 to 60 ml per serving, and/or for dispensing lungos, e.g. a volume in the range of 70 to 150 ml per serving.

Typically, the ingredient is contained in a capsule having an aluminium or plastic or paper enclosure and supplied within the capsule to the processing module of the machine. Generally speaking, the capsule can be of the type described above under the header "field of the invention". Suitable capsules are for example disclosed in EP 0 512 468, EP 0 512 470 and EP 2 068 684.

The capsule may have a flange, e.g. a rim, and a receptacle that is symmetric or asymmetric relative to the flange, conical or frusto-conical or cylindrical or spherical or hemispherical or frusto-spherical, for holding the capsule content, such as a beverage ingredient, e.g. ground coffee, tea or cacao or another beverage ingredient. The flange may be deformed while it is handled by the device, e.g. the flange may be urged from a position in which it is immobilized by stop means beyond such stop means. The stop means for stopping the capsule inbetween the first and second parts can be arranged so that when the first part is moved from the transfer position to the extraction position the capsule can be taken over (and usually secured) by the first and second parts.

The mechanical transmission can be associated with a travel stop arrangement, such as an arrangement for stopping the first part when reaching the transfer position or the extraction position and/or for stopping a relative movement of the first and second portions when reaching their first relative position and/or their second relative position. For instance, the travel stop arrangement includes one or more stop members fixed to the frame and one or more interference surfaces formed on the mechanical transmission and interfering with the stop member(s) when the first part reaches the transfer or extraction position or when the first and second portions reach their first or second relative position.

The capsule handling device may include a mechanical transmission connecting the actuator to the first part and to the second part for driving: the first part between its transfer position and its extraction position; and the first and/or second portions of the second part to relatively move the first and second portions between their first and second relative positions.

The mechanical transmission may comprise: a first mechanical transmission for driving the first part between the transfer position and the extraction position; and a second mechanical transmission for driving the first and/or second portions of the second part to relatively move the first and second portions between their first and second relative positions. For instance, the second mechanical transmission is in a parallel (non-serial) transmission configuration to the first mechanical transmission.

The second mechanical transmission can be associated with a travel stop arrangement, such as an arrangement for stopping the first part when reaching the transfer position or the extraction position and/or for stopping a relative movement of the first and second portions when reaching their first relative position and/or their second relative position. For instance, the travel stop arrangement includes one or more stop members fixed to the frame and one or more interference surfaces formed on the second mechanical transmission and interfering with the stop member(s) when the first part reaches the transfer or extraction position or when the first and second portions reach their first or second relative position.

The mechanical transmission may further include a common transmission connecting to the actuator the first mechanical transmission and the second mechanical transmission.

The first mechanical transmission may include a cam arrangement.

For instance, the cam arrangement comprises a driving guide member driven by the actuator, e.g. in rotation about a distant axis, along a guide path of the first part e.g. in a support of the first part. Optionally, when the first part is in its transfer position, the guide member can be movable along two different directions of the guide path so as to drive the first part to its extraction position when the guide member is moved along either direction of the guide path. The guide path can have symmetric portions or asymmetric portions extending into the different directions to cause the same displacement or a different displacement of the first part depending on the direction taken by the driving guide member along the guide path. Such a different displacement may be desirable to compensate for a change in the closure distance (between the transfer position and the extraction position of the first part), e.g. due to a change of dimension of the second part and/or due to the use of capsules of different shapes.

For instance, the cam arrangement comprises a driving member delimiting a guide path driven by the actuator, e.g. in rotation about a distant axis, along a guide member of the first part. Optionally, when the first part is in its transfer position, the guide path can be movable into two different directions along the guide member so as to drive the first part to its extraction position when the guide path is moved into either direction of the guide path. The guide path can have symmetric portions or asymmetric portions extending into the different directions to cause the same displacement or a different displacement of the first part depending on the direction taken along the guide member by the driving member delimiting the guide path. As mentioned above, such a different displacement may be desirable to compensate for a change in the closure distance.

The second mechanical transmission may include a driving guide member, such as one or more members of a cam shaft, driven by the actuator, e.g. in rotation about a distant axis, along a guide path of the second part, such as of the first and/or the second portions of the second part. Optionally, when the first part is in its extraction position, the guide member can be movable along two different directions of the guide path so as to relatively drive the first and/or second portions out of their first or second relative position when the guide member is moved along either direction of the guide path. The guide path can have symmetric portions or asymmetric portions extending into the different directions to cause the same displacement or a different relative displacement of the first and second portions depending on the direction taken by the driving guide member along the guide path.

The second mechanical transmission can include a driving member delimiting a guide path driven by the actuator, e.g. in rotation about a distant axis, along a guide member of the second part, such as of the first and/or the second portions of the second part. Optionally, when the first part is in its extraction position, the guide path is movable into two different directions along the guide member so as to relatively drive the first and second portions out of their first or second relative position when the guide path is moved into either direction of the guide path. The guide path can have symmetric portions or asymmetric portions extending into the different directions to cause the same displacement or a different displacement of the first part depending on the direction taken along the guide member by the driving member delimiting the guide path.

The mechanical transmission can include a common transmission connecting the first mechanical transmission and the second mechanical transmission to the actuator. The common transmission may include a power divider driven by the actuator. The actuator can be connected to the divider via at least one of pinions e.g. toothed pinions, wheels e.g. toothed wheels, racks e.g. toothed racks, worm drives, knuckle joint arrangements, cam arrangements and belts.

The actuator may include a drive output, such as a rotor or an axle, that operates selectively in a first direction and in a second direction different to the first direction, such as a rotor or an axle that rotates selectively in a clockwise direction and in a counter-clockwise direction.

The first part can be moved from the transfer position to the extraction position by the actuator irrespectively of the first and second directions of operation of the drive output while the first and second portions of the second part are relatively moved by the actuator either to their first relative position or to their second relative position depending on the direction of operation of the drive output.

The first part can be moved from the extraction position to the transfer position by the actuator irrespectively of the first and second directions of operation of the drive output while the first and second portions of the second part are relatively moved to an intermediate relative position by the actuator either from their first relative position or from their second relative position irrespectively of the first and second directions of operation of the drive output.

Optionally, the actuator is controlled to operate the drive output in the first direction or in the second direction via a user-interface or via a sensor arranged to sense a characteristic of a capsule to be handled by the device, such as a size and/or a type of the capsule.

A manual or an automatic capsule recognition or sensing system may be used to parameterize and adjust the processing of the capsule, e.g. to adjust the extraction chamber, automatically in line with the recognized or sensed capsule type or size. Suitable automatic capsule sensing and recognition systems are for example disclosed in WO 2012/123440 and PCT/EP13/070167.

The capsule may be fed to the handling device from a capsule loader, e.g. an automatic capsule loader such as a capsule loader that is driven by the device's actuator. Suitable capsule loaders are for example disclosed in PCT/EP13/064001, PCT/EP13/064003 and EP2013196594.

In an embodiment, the device comprises at least one clutch.

The clutch may be a forward-reverse clutch mounted either between the actuator and the first part or between the actuator and the second part. In such an embodiment, the first part can be moved from the transfer position to the extraction position by the actuator or from the extraction position to the transfer position depending on the direction of operation of the drive output and the first and second portions of the second part can be relatively moved by the actuator either to their first relative position or to their second relative position depending on the direction of operation of the drive output, the forward-reverse clutch being arranged to transmit an actuation from the actuator either forward or reversed depending on whether the first and second portions of the second part are to be moved: to their first relative position or to their second relative position when the first part is to be moved to its extraction position; and from their first relative position or from their second relative position when the first part is to be moved to its transfer position.

The clutch may be a decoupling clutch configured to provide a selective coupling and uncoupling between the actuator and the second part. In such an embodiment, the first part can be in its transfer position and is then moved or is then to be moved into its extraction position by the actuator, the first and second portions of the second part being in their first relative position or in their second relative position, the second part being: coupled to the actuator when the first and second portions are to be moved out of their relative position; or uncoupled from the actuator when the first and second portions are to remain in their relative position. In this particular embodiment, the first part can be in its extraction position and is then moved or is then to be moved into its transfer position by the actuator, the first and second portions of the second part being in their first relative position or in their second relative position, the second part being: coupled to the actuator when the first and second portions are to be moved out of their relative position; or uncoupled from the actuator when the first and second portions are to remain in their relative position.

The clutch can be controlled via a user-interface or via a sensor arranged to sense a characteristic of a capsule to be handled by the device, such as a size and/or a type of the capsule. The clutch may be actuated between its forward-reverse configurations or its coupling/decoupling configurations by an automatic clutch actuator, e.g. connected to a control unit or directly to a user-interface or sensor.

The actuator of the capsule handling device can be an electric motor, such as a bi-directionally or unidirectionally operating motor.

For instance, the motor is so connected to the movable first part as to drive the first part from the transfer position to the extraction position in either operating direction and, depending on the operating direction of the motor, to not drive the portions of the second part relatively to one another or to relatively drive the first and second portions to the first relative position or to the second relative position or to an intermediate relative position.

For instance, the motor is so connected to the movable first part as to drive the first part from the transfer position to the extraction position in only one operating direction and, depending on a state of a forward-reverse clutch or of a selective coupling/uncoupling clutch between the motor and the second part, to not drive the portions of the second part relatively to one another or to relatively drive the first and second portions to the first relative position or to the second relative position or to an intermediate relative position.

The actuator of the capsule handling device can be a user-handle e.g. a pivotable user-handle.

The user-handle can be operable into two different directions to move the first part from the transfer position to the extraction position and, depending on the operating direction of the handle, to not drive the portions of the second part relatively to one another or to relatively drive the first and second portions to the first relative position or the second relative position or to an intermediate relative position.

The user-handle may be operable into a single direction to move the first part from the transfer position to the extraction position and, depending on a state of a forward-reverse clutch or on a selective coupling/uncoupling clutch between the handle and the second part, to not drive the portions of the second part relatively to one another or to relatively drive the first and second portions to the first relative position or to the second relative position or to an intermediate relative position.

In an embodiment, the capsule handling device is configured to handle a first capsule of first dimensions as well as a second capsule of second dimensions different to these first dimensions. For instance, the different capsules may have different first and second capsule diameters and/or different first and second capsule heights. The first and second portions of the second part may be arranged to delimit:
  in their first relative position, the cavity and the extraction chamber with first dimensions for receiving and extracting the first capsule; and
  in their second relative position, the cavity and the extraction chamber with second dimensions for receiving and extracting the second capsule, such as second dimensions that are smaller than these first dimensions.

Optionally, the chamber in the first relative position being is dimensionally unfit to hold the second capsule for extracting it and/or the chamber in the second relative position is dimensionally unfit to hold the first capsule for extracting it.

The invention also relates to a combination of a machine as described above and a capsule. Optionally, the capsule is selected from a set of a first capsule having first dimensions and a second capsule having second dimensions different to the first dimensions and which can both be handled and extracted in the extraction chamber.

A further aspect of the invention relates to a method of handling, in a machine as described above, a capsule. Optionally, the capsule is selected from a set of a first capsule having first dimensions and a second capsule having second dimensions different to the first dimensions and which can both be handled and extracted in the extraction chamber.

The method comprises:
  immobilizing the capsule between the first and second parts when the first part is in its transfer position;
  moving by the actuator the first part to the extraction position, whereby when needed a relative movement of the first and second portions of the second part between their first and second relative positions is driven by the actuator; and
  extracting the capsule in the thereby formed extraction chamber;
and optionally:
  moving by the actuator the first part to the transfer position, whereby when needed a relative movement of the first and second portions of the second part can be driven by the actuator; and
  removing the extracted capsule.

Another aspect of the invention relates to a use of a capsule. The use of the capsule is for
  handling the capsule in a machine as described above;
  implementing a combination as mentioned above which comprising the capsule and the described machine; or
  carrying out a method for handling the capsule as described above.

The capsule is successively:
  immobilized between the first and second parts when the first part is in its transfer position;
  enclosed in the extraction chamber formed by moving by the actuator the first part to the extraction position, whereby when needed a relative movement of the first and second portions of the second part between the first and second relative positions can be driven by the actuator; and
  extracted in the extraction chamber; and optionally
  removed from the extraction chamber by moving the first part to the transfer position by the actuator, whereby when needed a relative movement of the first and second portions of the second part can be driven by the actuator.

The capsule may be selected from a set of a first capsule having first dimensions and a second capsule having second dimensions different to the first dimensions and which can both be handled and extracted in the extraction chamber.

BRIEF DESCRIPTION OF THE DRAWINGS

The invention will now be described with reference to the schematic drawings, wherein:

FIGS. 2a to 7a and 2b to 7b illustrate a closing and opening sequence of this device handling a large capsule and a small capsule, respectively;

FIG. 8 is a horizontal cross-sectional view of this handling device when open, FIGS. 8a and 8b illustrating in a perspective view from above the closed device that is horizontally cutaway and that is in a configuration for handling a large capsule and a small capsule, respectively;

FIGS. 9 and 10 show an implementation of the above machine where the handling device is provided with an electric motor and is open and closed, respectively;

DETAILED DESCRIPTION

Figure 11:
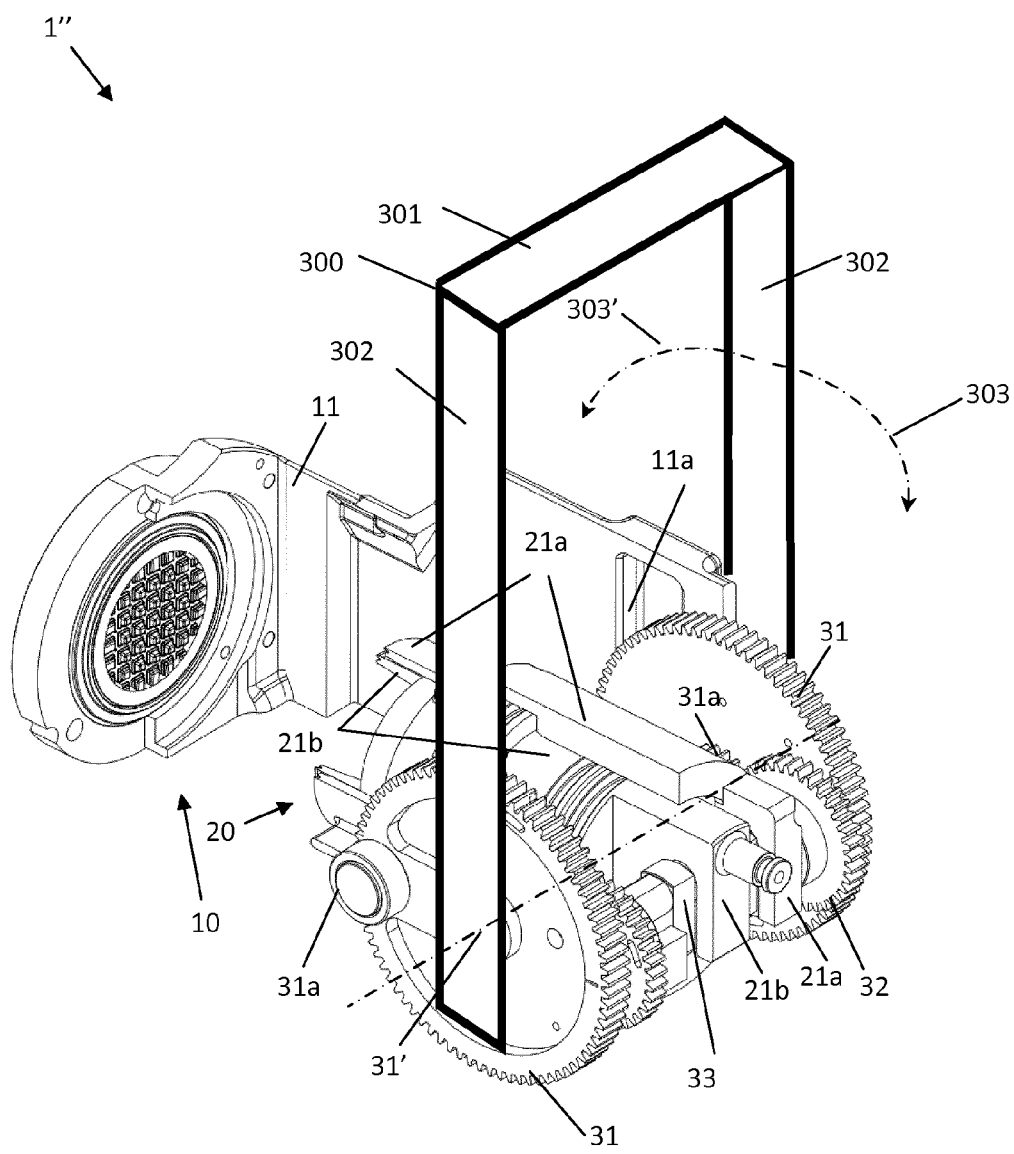
FIG. 11 illustrates an implementation of the above machine in which the handling device is provided with a handle.
Figure 12:
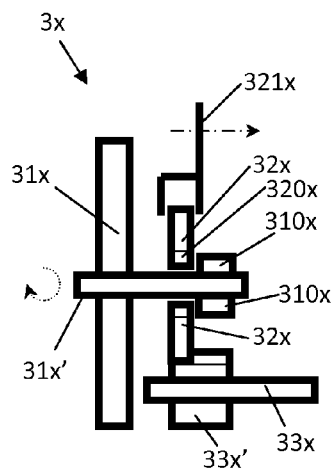
FIGS. 12 and 13 show a selective connecting/disconnecting clutch in its disconnected and disconnected state, respectively, that is implementable in an alternative embodiment of the above machine.
Figure 13:
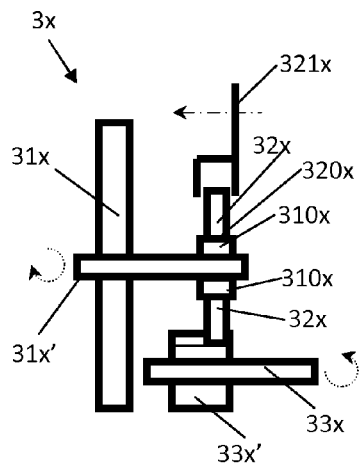
Figure 16:
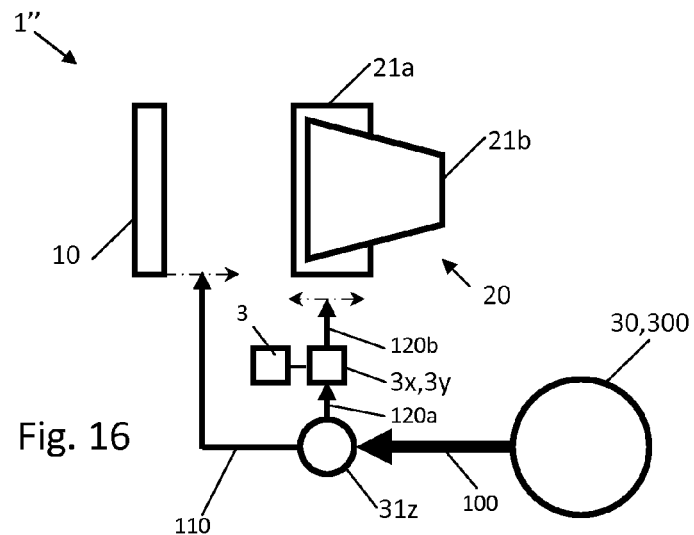
FIGS. 16 to 18 schematically show different implementations of the clutches of FIGS. 12 to 15
Figure 17:
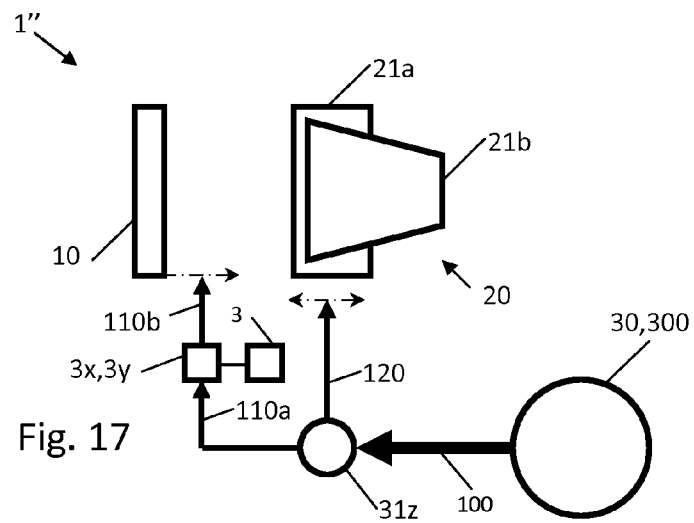
Figure 18:
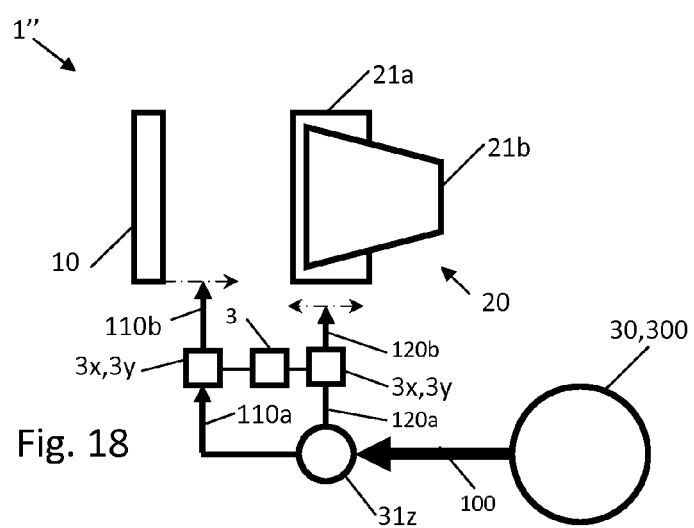

An exemplary machine 1 with a capsule handling device 1" according to the invention is generally shown in FIGS. 1 to 8b. A first implementation of device 1" with a motor 30 is illustrated in FIGS. 9 and 10. A second implementation of device 1" with a handle 300 is illustrated in FIG. 11. FIGS. 12 and 13 as well as 14 and 15 illustrate two clutches 3x,3y for implementing alternative transmissions connecting motor 30 or handle 300 to movable elements 10,21a,21b of device 1". Different embodiments of an implementation of clutches 3x,3y in modified handling device 1" are illustrated in FIGS. 16 to 18.

In particular, machine 1 comprises a frame 1' and a capsule handling device 1" mounted in and/or on the frame 1'.

For example, frame 1' supports a control unit 3 and/or a machine's fluid circuit 4. Control unit 3 typically includes a controller or processor μC and/or a printed circuit board and/or and electric power management and/or a user-interface. The machine's fluid circuit 4 may include one or more fluid conduits 40, a water source, e.g. a tank 41 and/or connector to the city water distribution, a pump 42 and a thermal conditioner 43 such as a heater and/or a cooler. Control unit 3 is typically arranged to control the machine's fluid circuit 4 and can be connected to pump 42, thermal conditioner 43, a sensors such as a temperature sensor, flowmeter a pressure sensor, a level sensor (e.g. in a tank 41). When present, a motor 30 (FIGS. 9 and 10) is typically connected to control unit 3. Control unit 3 may also be connected to position or motion sensors associated with any movable part 10,20-21b,30-33b of machine 1, e.g. of the machine's capsule handling device 1". Control unit 3 can be configured to control the state of clutches 3x,3y (FIGS. 16 to 18).

Examples of fluid circuits are disclosed in WO 2009/074550 and in WO 2009/130099.

A suitable thermal conditioner 43 may include a heater and/or a cooler such as a heater that is a thermoblock or an on demand heater (ODH), for instance an ODH type disclosed in EP 1 253 844, EP 1 380 243 and EP 1 809 151.

Suitable control unit configurations and connections are for example disclosed in WO 2009/043851 and WO 2009/043865.

Handling device 1" can have an outlet 11b for dispensing an extract of a capsule 2a,2b handled by device 1".

Outlet 11b may be arranged for dispensing beverage to a user, e.g. to an area for placing a user-cup or a user-mug. The dispensing area may be delimited at the bottom by a support surface for holding a user cup or mug. Such support surfaces are well known in the art, e.g. as disclosed in EP 1 867 260 and WO 2009/074557.

Optionally, handling device 1" has a fluid inlet 23 connected to machine's fluid circuit 4,40,41,42,43 for circulating a fluid into such capsule 2a,2b.

Capsule handling device 1" comprises:
- a first part 10 that is movable relatively to frame 1' from a transfer position for inserting and/or removing capsule 2a,2b to an extraction position for extracting capsule 2a,2b and vice versa;
- a second part 20 that has a capsule receptacle 21 delimiting a cavity 21' for receiving such capsule 2a,2b and for forming an extraction chamber 21" with first part 10 in its extraction position, second part 20 comprising a first portion 21a and a second portion 21b that are relatively movable between a first relative position (FIGS. 4a and 8a) and a second relative position (FIGS. 4b and 8b) to change at least one dimension 21da,21db, 21ha,21hb of cavity 21' and of extraction chamber 21"; and
- an actuator 30,300, such as a motor 30 or a user-handle 300, connected to first part 10 for driving movable first part 10 between the transfer position and the extraction position, for instance an actuator 30,300 that is fixed in or to the frame 1' and typically having a movable output member 30',31' driving first part 10.

Examples of a actuators having a motor are disclosed in EP 1767129, WO 2012/025258, WO 2012/025259 and WO 2013/127476. Example of actuators having a user-handle are disclosed in WO 2005/004683, WO2007/135136 and WO 2009/043630

Handling device 1" may include or delimit or be associated with a capsule feed channel, e.g. a chimney, for guiding capsule 2a,2b, e.g. guiding capsule 2a,2b by gravity, to inbetween first and second parts 10,20 in the transfer position and immobilize capsule 2a,2b therebetween to then form extraction chamber 21" for extracting capsule 2a,2b. Examples of such capsule feed and immobilization channels are disclosed in EP2013196041 and EP2013196042.

Extraction chamber 21" may be configured for holding and housing capsule 2a,2b that contains a flavouring ingredient, such as tea or coffee or chocolate or powder milk and/or any other content mentioned above.

A flavoured beverage may be prepared by circulating a carrier liquid, such as water, into extraction chamber 21" to flavour the liquid by exposure to a flavouring ingredient contained in capsule 2a,2b held in extraction chamber 21".

When capsule 2a,2b is located in extraction chamber 21", an axis of symmetry of capsule 2a,2b may generally be aligned with a corresponding axis of symmetry of extraction chamber 21". To accommodate capsules of different sizes, chamber 21 may have variable dimensions fitting about the capsules and/or closure distances, as for example taught in PCT/EP13/070756 and PCT/EP13/070866.

Upon extraction, capsule 2a,2b may be removed from device 1" by using a suitable capsule remover, e.g. as disclosed in EP2013196040.

Optionally, first part 10 has a support 11 with an outlet 11b for letting out an extract of capsule 2a,2b e.g. via or along an opening device such as via an opening plate 12 e.g. fixed to or integral with support 11.

Optionally, second part 20 has an inlet 23 for letting a fluid into the chamber 21" to capsule 2a,2b e.g. via or along an opening device such along as one or more piercing elements 22 in cavity 21'.

Opening devices are optional or not needed when machine 1 is destined to be used for capsules with pre-opened corresponding capsule walls or faces.

When closed capsules 2a,2b are used, first and second parts 10,20 may include a capsule opener such as piercing elements, e.g. blades, and/or a tearing tool, e.g. an opening plate 12, for example with a tearing profile, for instance as known from Nespresso™ machines. See for example EP 0 512 468, EP 0 512 470, PCT/EP2013/073530, EP2013180164.9 and EP2013180166.4 and EP2013180165.6.

Optionally, at least one of first and second portions 21a,21b comprises a base 211a,211b and a dimensional adjuster 210a,210b movably mounted to base 211a,211b, such as an anti-backlash arrangement for urging first and second parts 10,20 together and/or against capsule 2a,2b, e.g. for sealing. For instance, dimensional adjuster 210a, 210b is actuated hydraulically e.g. via a hydraulic circuit that comprises a fluid passage 213a,213b and/or one or more sealing elements 212a,212b,212c. Such hydraulic circuit 213a,213b,212a,212b,212c can be connected to the machine's fluid circuit 4 e.g. to fluid inlet 23 of device 1". Fluid passage 213a,213b may be connected to cavity 21' and/or extraction chamber 21". Examples of such dimensional adjusters are disclosed in WO 2008/037642.

Handling device 1" may be arranged for handling selectively different types and/or sizes 2da,2db,2ha,2h of capsules 2a,2b. Capsules 2a,2b may differ as to the volume of their content and/or the conditions for extracting the content, e.g. temperature, pressure and/or flow caracteristics.

A manual or an automatic capsule recognition or sensing system may be used to parameterize and adjust the handling of capsule 2a,2b, e.g. to adjust chamber 21", automatically in line with the recognized or sensed capsule type or size, and/or the conditions of extracting capsule 2a,2b, e.g. temperature and/or volume and/or pressure extraction conditions. Suitable automatic capsule sensing and recognition systems are for example disclosed in WO 2012/123440 and PCT/EP13/070167.

Capsule 2a,2b may be fed to handling device 1" from a capsule loader, e.g. an automatic capsule loader such as a capsule loader that is driven by actuator 30,300. Suitable capsule loaders are for example disclosed in PCT/EP13/ 064001, PCT/EP13/064003 and EP2013196594.

Device 1" can be arranged for handling selectively a first capsule 2a having a first flange 2a' and a second capsule 2b having a second flange 2b' smaller than first flange 2a'. For instance, second flange 2b' has a dimension, e.g. diameter 2db, that is smaller than a dimension, e.g. diameter 2da, of first flange 2a'. Optionally, second capsule 2b has a height 2hb that is smaller than a height 2ha of first capsule 2a.

Capsule 2a,2b can be of the type described above under the header "field of the invention". Capsule 2a,2b may have a capsule bottom 2a''',2b''', e.g. an flow-through face such as an inflow-face, from which extends a sidewall to flange 2a',2b' to form a container-body or receptacle, e.g. a generally cup-shaped body, for holding the capsule content, such as a beverage ingredient. Capsule 2a,2b may have an axis of symmetry, for example an axis of revolution generally concentric with flange 2a',2b'. Capsule 2a,2b may have a face extending across flange 2a',2b', e.g. forming a flow-through face such as an extraction face. Liquid may circulated via these faces through capsule 2a,2b, e.g. a carrier liquid such as water, to be mixed with the content of capsule 2a,2b.

Flange 2a',2b' of capsule 2a,2b may serve for:
    guiding capsule 2a,2b to inbetween parts 10,20, e.g. via corresponding guide portions of machine 1;
    removing capsule 2a,2b from parts 10,20 after extraction; and/or
    to seal a mouth 21''' of part 20, such as a mouth 21a'',21b'' of portion 21a,21b, against part 10, e.g. plate 12, when part 10 is in its extraction position against part 20.

In an alternative embodiment, the capsule may be devoid of such a flange. In such a case and if needed, the capsule may be guided via its flangeless body, the capsule may be removed by an ejector pusher movable into cavity 21' or from plate 12, and part 10 in its extraction position may be sealed together with part 20 by direct contact thereof. It will be evident to the skilled person that such features may also be implemented for handling a capsule with a flange.

The storage space of capsule 2b may be smaller than the storage space of capsule 2a. For instance, first capsule 2a may for instance have a shoulder portion adjacent flange 2a' that provides additional storage space for the content, e.g. ingredient.

Suitable capsules are for example disclosed in EP 0 512 468, EP 0 512 470 and EP 2 068 684.

Actuator 30,300 is further connected to second part 20 for driving first and/or second portions 21a,21b to relatively move first and second portions 21a,21b between their first and second relative positions. Optionally, actuator drives first part 10 and first and second portions 21a,21b: simultaneously; or sequentially; or partly simultaneously and partly sequentially.

Hence, a single actuator may actuate part 10 between the transfer and the extraction position as well as portions 21a,21b of part 20 between their first and second relative positions.

Device 1" can comprise a mechanical transmission connecting actuator 30,300 to first part 10 and to second part 20 for driving: first part 10 between the transfer position and the extraction position; and first and/or second portions 21a,21b of second part 20 to relatively move first and second portions 21a,21b between their first and second relative positions.

The mechanical transmission can be associated with a travel stop arrangement 1a',32';1a'',32'' as illustrated in FIGS. 8 to 10. Travel stop arrangement 1a',32';1a'',32'' may be configured to stop first part 10 when reaching the transfer position or the extraction position and/or to stop a relative movement of first and second portions 21a,21b when reaching their first relative position and/or their second relative position. Travel stop arrangement 1a',32';1a'', 32'' may include one or more stop members 1a',1a'' (schematically indicated in dotted lines in FIG. 10) fixed to frame 1' and one or more interference surfaces 32',32'' formed on the mechanical transmission and interfering with stop member(s) 1a',1a'' when first part 10 reaches the transfer or extraction position or when first and second portions 21a, 21b reach their first or second relative position.

The mechanical transmission may comprise: a first mechanical transmission 31a,11a for driving first part 10 between the transfer position and the extraction position; and a second mechanical transmission 31b,32,33,21a',21b' for driving first and/or second portions 21a,21b of second part 20 to relatively move first and second portions 21a,21b between their first and second relative positions. For instance, second mechanical transmission 31b,32,33,21a', 21b' is in a parallel (non-serial) transmission configuration to the first mechanical transmission 31a,11a.

Second mechanical transmission 31b,32,33,21a',21b' can be associated with a travel stop arrangement 1a',32';1a'',32'' as illustrated in FIGS. 8 to 10. Travel stop arrangement 1a',32';1a'',32'' may be configured to stop first part 10 when reaching the transfer position or the extraction position and/or to stop a relative movement of first and second portions 21a,21b when reaching their first relative position and/or their second relative position. Travel stop 1a',32';1a", 32" arrangement may comprise one or more stop members 1a',1a" fixed to frame 1' and one or more interference surfaces 32',32" formed on the second mechanical transmission and interfering with stop member(s) 1a',1a" when first part 10 reaches the transfer or extraction position or when first and second portions 21a,21b reach their first or second relative position.

Optionally, the mechanical transmission further comprises a common transmission 30',30",30''',31 connecting to actuator 30,300 on the one hand first mechanical transmission 31a,11a and on the other hand second mechanical transmission 31b,32,33,21a',21b'.

The first mechanical transmission can comprise a cam arrangement 31a,11a that may comprise a driving guide member 31a driven by actuator 30,300, e.g. in rotation about a distant axis 31', along a guide path 11a of first part 10 e.g. in a support 11 of first part 10. Optionally, when first part 10 is in its transfer position, guide member 31a is movable along two different directions of guide path 11a so as to drive first part 10 to its extraction position when guide member 31 is moved along either direction of guide path 11a. Guide path 11a can have symmetric portions or asymmetric portions extending into the different directions to cause the same displacement or a different displacement of first part 10 depending on the direction taken by the driving guide member 31a along the guide path The first mechanical transmission can comprise a cam arrangement that may comprise a driving member delimiting a guide path driven by the actuator, e.g. in rotation about a distant axis, along a guide member of the first part. Optionally, when the first part is in its transfer position, the guide path is movable into two different directions along the guide member so as to drive the first part to its extraction position when the guide path is moved into either direction of the guide path. The guide path can have symmetric or asymmetric portions extending into the different directions to cause the same displacement or a different displacement of the first part depending on the direction taken along the guide member by the driving member delimiting the guide path.

Second mechanical transmission 31b,32,33,21a',21b' may include a driving guide member 33a,33b, such as one or more members 33a,33b of a cam shaft 33, driven by actuator 30,300, e.g. in rotation about a distant axis 33', along a guide path 21a',21b' of second part 20, such as of first and/or second portions 21a,21b of second part 20. Optionally, when first part 10 is in its extraction position, guide member 33a,33b is movable along two different directions of guide path 21a',21b' so as to relatively drive first and/or second portions 21a,21b out of their first or second relative position when guide member 33a,33b is moved along either direction of guide path 21a',21b', such as a guide path with symmetric portions or asymmetric portions extending into the different directions to cause the same displacement or a different relative displacement of first and second portions 21a,21b depending on the direction taken by driving guide member 33a,33b along guide path 21a',21b'.

Second mechanical transmission 31b,32,33,21a',21b' can include a driving member delimiting a guide path driven by the actuator, e.g. in rotation about a distant axis, along a guide member of the second part, such as of the first and/or the second portions of the second part. Optionally, when the first part is in its extraction position, the guide path is movable into two different directions along the guide member so as to relatively drive the first and second portions out of their first or second relative position when the guide path is moved into either direction of the guide path. The guide path can have symmetric portions or asymmetric portions extending into the different directions to cause the same displacement or a different displacement of the first part depending on the direction taken along the guide member by the driving member delimiting the guide path.

The mechanical transmission may include common transmission 30',30",30''',31 connecting first mechanical transmission 31a,11a and second mechanical transmission 31b, 32,33,21a',21b' to actuator 30, common transmission comprising a power divider 31 driven by actuator 30,300. Power divider 31 may be driven by actuator 30,300 via at least one of: pinions e.g. toothed pinions 30",30''', wheels e.g. toothed wheels, racks e.g. toothed racks, worm drives 30', knuckle joint arrangements, cam arrangements and belts.

Mechanical power 100 generated by actuator 30,300 may thus be divided into a first stream 110,110a,110b to first part 10 and a second stream 120,120a,120b to first and second portions 21a,21b of second part 20.

Actuator 30,300 can have a drive output 30',31', such as a rotor 30' of motor 30 or an axle 31' of handle 300, that operates selectively in a first direction and in a second direction different to the first direction, such as a rotor or an axle that rotates selectively in clockwise direction 303 and in a counter-clockwise direction 303'.

First part 10 can be moved:
from the transfer position to the extraction position by actuator 30,300 irrespectively of the first and second directions of operation of drive output 30',31' while first and second portions 21a,21b of second part 20 are relatively moved by actuator 30,300 either to their first relative position or to their second relative position depending on the direction of operation of drive output 30',31'; and/or
from the extraction position to the transfer position by actuator 30,300 irrespectively of the first and second directions of operation of the drive output 30',31' while first and second portions 21a,21b of second part 20 are relatively moved to an intermediate relative position (FIGS. 1, 1a, 1b, 7a, 7b and 8) by actuator 30,300 either from their first relative position or from their second relative position irrespectively of the first and second directions of operation of the drive output 30',31'.

Optionally, actuator 30,300 is controlled to operate drive output 30' in first direction or in second direction via a user-interface 3,301 or via a sensor 3 arranged to sense a characteristic of a capsule 2a,2b to be handled by device 1", such as a size and/or a type of capsule 2a,2b.

Device 1" may comprise a clutch 3x,3y, as illustrated by way of examples in FIGS. 12-15. Other clutch configurations as known in the corresponding (clutch) art providing the same or similar functions can be used. Such clutches 3x,3y may be included between actuator 30,300 and first part 10 and/or between actuator 30,300 and second part 20, as illustrated in FIGS. 16-18.

For instance, clutch 3y is a forward-reverse clutch 3y mounted either between actuator 30,300 and first part 10 or between actuator 30,300 and second part 20. First part 10 can be moved from the transfer position to the extraction position by actuator 30,300 or from the extraction position to the transfer position depending on the direction of operation of the drive output 30',31'. First and second portions 21a,21b of second part 20 may be relatively moved by actuator 30,300 either to their first relative position or to their second relative position depending on the direction of operation of drive output 30',31'. Forward-reverse clutch 3y can be arranged to transmit an actuation from actuator 30,300 either forward or reversed depending on whether first and second portions 21a,21b of second part 20 are to be moved: to their first relative position or to their second relative position when first part 10 is to be moved to its extraction position; and from their first relative position or from their second relative position when first part 10 is to be moved to its transfer position.

Figure 14:
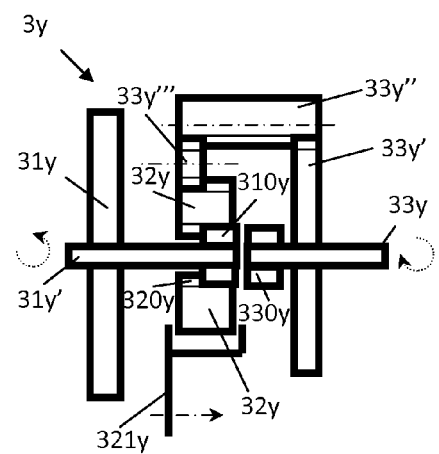
FIGS. 14 and 15 show a forward-reverse clutch in a reverse and forward state, respectively, for implementation in an alternative embodiment of the above machine.
Figure 15:
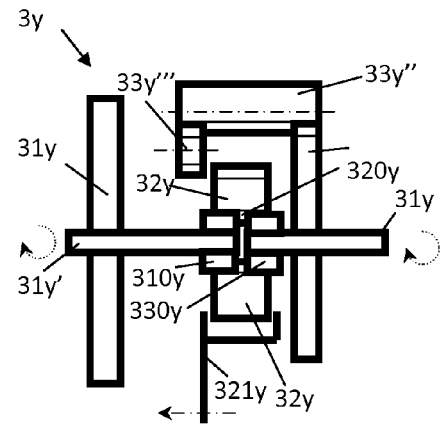

In FIG. 14, clutch 3y is shown in its reversing configuration in which the mechanical power entering via wheel 31y and axle 31y' is transferred via coupling 310y to wheel 32y, pinion 33y''', bypass pinion 33y'' and wheel 33y' to output axle 33y. In FIG. 15, clutch 3y is shown in its forward configuration in which the mechanical power entering via wheel 31y and axle 31y' is transferred via couplings 310y, 330y and coupling wheel 32y directly to axle 33y. Wheel 32y has an inner toothed periphery 320y that is slidable over couplings 310y,330y, e.g. toothed outer periphery of axles 31y',33y, when switch 321y is moved to drive wheel 32y over couplings 310y,330y.

For instance, clutch 3x is a decoupling clutch 3x configured to provide a selective coupling and uncoupling between actuator 30,300 and second part 20. First part 10 can be in its transfer position and is then moved or is then to be moved into its extraction position by actuator 30,300, first and second portions 21a,21b of second part 20 being in their first relative position or in their second relative position, second part 20 being:
- coupled to actuator 30,300 when first and second portions 21a,21b are to be moved out of their relative position, or
- uncoupled from actuator 30,300 when first and second portions 21a,21b are to remain in their relative position, and
- wherein, when first part 10 is in its extraction position and is then moved or is then to be moved into its transfer position by actuator 30,300, first and second portions 21a,21b of second part 20 being in their first relative position or in their second relative position, the second part 20 being:
  - coupled to actuator 30,300 when first and second portions 21a,21b are to be moved out of their relative position, or
  - uncoupled from actuator 30,300 when first and second portions 21a,21b are to remain in their relative position.

In FIG. 12, clutch 3x is shown in its uncoupling configuration in which the mechanical power entering via wheel 31x and axle 31x' is not transferred further, in particular not transferred to output axel 33x, since coupling wheel 32x is not fixed in rotation on axle 31x' which can freely rotate through wheel 32x. In FIG. 13, clutch 3x is shown in its coupling configuration in which coupling wheel 32x is mechanically coupled to axle 31x' via coupling 310x whereby wheel 32x is driven in rotation by rotating axle 31x'. For instance, wheel 32x has an inner toothed periphery 320x that is slidable over coupling 310x, e.g. a toothed outer periphery of axle 31x', when switch 321x is moved to drive wheel 32x over coupling 310x. When wheel 32x is coupled via coupling 310x to axle 31x', as illustrated in FIG. 13 as opposed to FIG. 12, then the mechanical power entering via wheel 31x and axle 31x' is transferred via coupling 310x and wheel 32x to wheel 33x' and axle 33x.

Movement of switch 321x,321y of either clutch 3x,3y may be controlled by control unit 3 or manually or via a capsule sensing system.

Optionally, clutch 3x,3y can be controlled via a user-interface or via a sensor arranged to sense a characteristic of capsule 2a,2b to be handled by device 1", such as a size 2da,2db,2ha,2hb and/or a type of capsule 2a,2b.

The transmission ratio via clutch 3x,3y can of course be adjusted as required, e.g. by adjusting the diameters of the wheels and pinions and/or by adding wheels and/or pinions.

The wheels and pinions of clutch 3x,3y can form friction gears or toothed gears or be replaced by other gear elements, e.g. belts or racks, e.g. toothed or friction gear elements.

The embodiment shown in FIGS. 9 to 11 can be modified by introducing such a clutch 3x,3y in the transmission between actuator 30,300 and first and/or second parts 10,20. For instance, clutch 3x,3y can be introduced into the above-mentioned second mechanical transmission whereby the relative movement of first and second portions 21a,21b can be driven directly through clutch 3x,3y, in other words the second mechanical transmission can include clutch 3x,3y as a means to control the forward or reverse movement from actuator 30,300.

For instance part 10 can follow the direction of the movement of actuator 30,300 whereas the relative movements (if any) of portions 21a,21b is determined by the state of the clutch (whether a coupling/uncoupling clutch or a forward reverse clutch) and the direction of the movement of actuator.

The actuator can be an electric motor 30, such as a bi-directionally operating motor, as illustrated in FIGS. 9 and 10. For instance, motor 30 is so connected to movable first part 10 so as: to drive first part 10 from the transfer position to the extraction position in either operating direction and, depending on the operating direction of the motor 30; to not drive portions 21a,21b of second part 20 relatively to one another; or to relatively drive first and second portions 21a,21b to the first relative position or to the second relative position or to an intermediate relative position. Optionally, motor 30 is so connected to movable first part 10 so as: to drive first part 10 from the transfer position to the extraction position in only one operating direction and, depending on the state of forward-reverse clutch 3y or of a selective coupling/uncoupling clutch 3x between motor 30 and second part 20; to not drive portions 21a,21b of second part 20 relatively to one another or to relatively drive first and second relative portions 21a,21b to the first relative position or to the second relative position or to an intermediate relative position.

The actuator can be a user-handle 300, e.g. a pivotable user-handle, as illustrated in FIG. 11. User-handle 300 may be operable into: two different directions to move first part 10 from the transfer position to the extraction position and, depending on the operating direction of handle 300, to not drive portions 21a,21b of the second part 20 relatively to one another or to relatively drive first and second portions 21a,21b to the first relative position or to the second relative position or to an intermediate relative position. User-handle 300 can be operable into: a single direction to move first part 10 from the transfer position to the extraction position and, depending on a state of a forward-reverse clutch 3y or on a selective coupling/uncoupling clutch 3x between handle 300 and second part 20, to not drive portions 21a,21b of second part 20 relatively to one another or to relatively drive first and second portions 21a,21b to the first relative position or the second relative position or to an intermediate relative position.

FIG. 16, in which the same references designate generally the same elements, illustrates schematically an embodiment of a handling device 1" in which a clutch 3x,3y, e.g.

controlled by control unit 3, is introduced into the second transmission. Power 100 generated by actuator 30,300 is transmitted by divider 31z, e.g. a generic divider which may be divider 31 or another divider, to first part 10 as power stream 110 and to second part 20 as power stream 120a,120b via clutch 3x,3y. The state and nature of clutch 3x,3y will determine whether or not power 120b is at all transmitted to part 20 and if transmitted whether it is forwarded or reversed.

FIG. 17, in which the same references designate generally the same elements, illustrates schematically an embodiment of a handling device 1" in which a clutch 3x,3y, e.g. controlled by control unit 3, is introduced into the first transmission. Likewise, the state and nature of clutch 3x,3y will determine whether or not power 110a is passed is at all transmitted as 110b to part 10 and if transmitted whether it is forwarded or reversed.

FIG. 18, in which the same references designate generally the same elements, illustrates schematically an embodiment of a handling device 1" in which a clutch 3x,3y, e.g. controlled by control unit 3, is introduced into the first transmission and another clutch 3x,3y, e.g. controlled by control unit 3, is introduced into the second transmission. Likewise, the state and nature of clutch 3x,3y will determine whether or not power 110b,120b is at all transmitted to parts 10,20 and if transmitted whether it is forwarded or reversed.

Depending on the configuration of handling device 1" and the nature and control of clutches 3x,3y, parts 10,20 may be simultaneously actuated or sequentially actuated or partly simultaneously and partly sequentially actuated by actuator 30,300.

Handling device 1" can be configured to handle a first capsule 2a of first dimensions 2da,2ha as well as a second capsule 2b of second dimensions 2db,2hb different to first dimensions 2da,2ha, for instance capsules 2a,2b differing by different first and second capsule diameters 2da,2db and/or or by different first and second capsule heights 2ha,2hb. First and second portions 21a,21b of second part 20 may delimit: in their first relative position, cavity 21' and extraction chamber 21" with first dimensions 21da,21ha for receiving and extracting first capsule 2a; and in their second relative position, cavity 21' and extraction chamber 21" with second dimensions 21db,21hb for receiving and extracting second capsule 2b, first dimensions 21da,21ha being for instance larger than second dimensions 21db,21hb. Optionally, chamber 21" in the first relative position being dimensionally unfit to hold for extracting second capsule 2b and/or chamber 21" in the second relative position being dimensionally unfit to hold for extracting first capsule 2a.

Alternatively, first and second portions 21a,21b of second part 20 may delimit in their first and in their second relative positions, cavity 21' and extraction chamber 21" of different dimensions for adjusting a confinement and/or a compression of a deformable and/or expandable capsule in chamber 21" to adjust the capsule extraction conditions.

Machine 1 and capsule 2a,2b are typically provided in a combination. Capsule 2a,2b may be selected from a set of a first capsule 2a having first dimensions 2da,2ha and a second capsule 2b having second dimensions 2db,2hb different to first dimensions 2da,2ha, for instance different first and second capsule diameters 2da,2db and/or different first and second capsule heights 2ha,2hb, machine 1 being able to handle and extract either capsule 2a,2b in extraction chamber 21".

A capsule 2a,2b can be handled in machine 1 by the following method:

immobilizing capsule 2a,2b between first and second parts 10,20 when first part 10 is in its transfer position;

moving by actuator 30,300 first part 10 to the extraction position, whereby a relative movement of first and second portions 21a,21b of second part 20 between their first and second relative positions can be driven by actuator 30,300; and extracting capsule 2a,2b in the thereby formed extraction chamber 21";

and optionally:

moving by actuator 30,300 first part 10 to the transfer position, whereby a relative movement of first and second portions 21a,21b of second part 20 can be driven by actuator 30,300; and removing the extracted capsule 2a,2b.

Such a method is illustrated in FIGS. 1a to 7a for a first capsule 2a and in FIGS. 1b to 7b for a second capsule 2b which is smaller than first capsule 2a.

In FIGS. 1a and 1b, part 10 of handling device 1" is in its transfer position and a capsule 2a,2b is located between part 10 and part 20. In FIGS. 2a to 4a and 2b to 4b part 10 is moved from the transfer position to the extraction position and first and second portions 21a,21b of part 20 are relatively moved to their first and second relative positions, respectively, e.g. from an intermediate relative position (FIGS. 1a and 1b) so as to adjust to the sizes of capsules 2a,2b.

Figure 1:
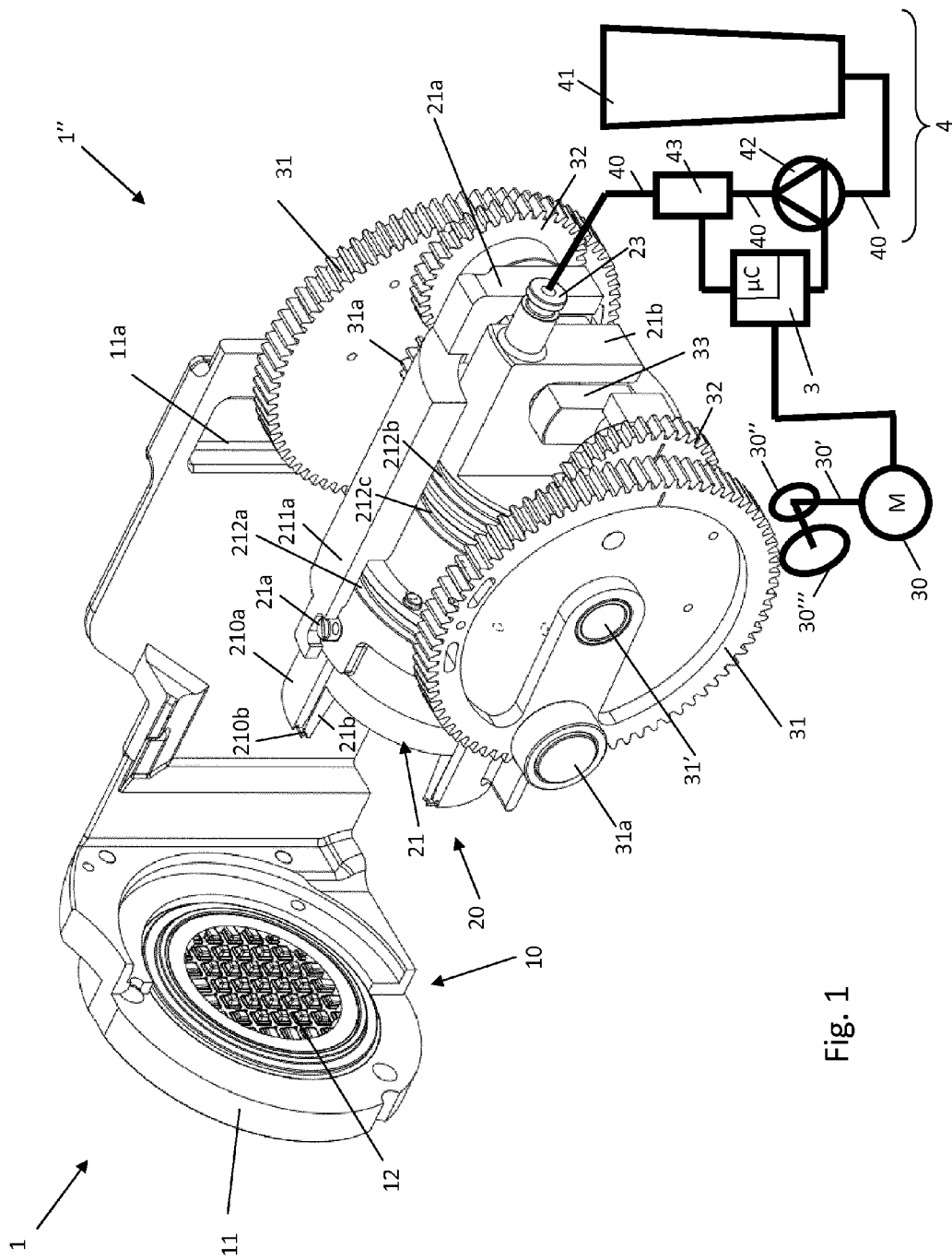
FIG. 1 illustrates part of a machine according to the invention with a perspective view of the machine's capsule handling device that is partly cutaway.
Figure 2A:
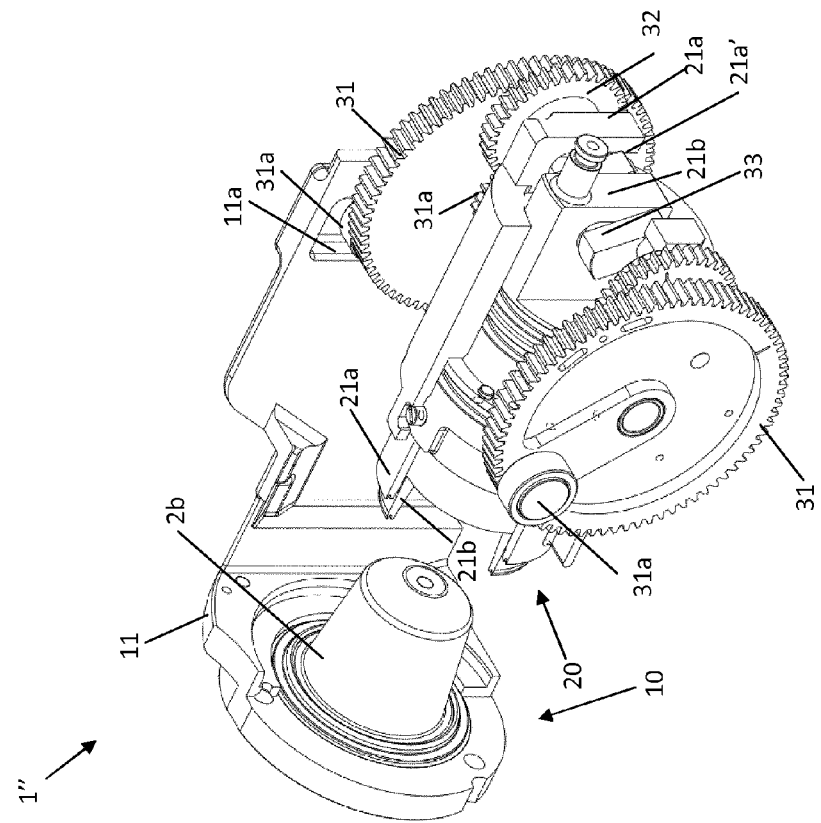
Figure 2B:
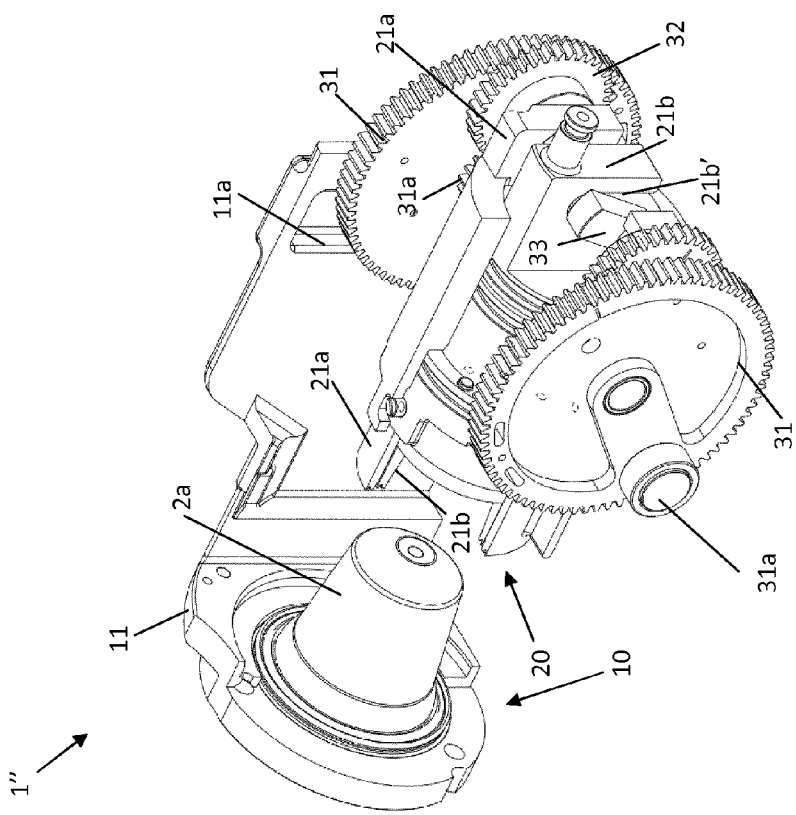
Figure 3A:
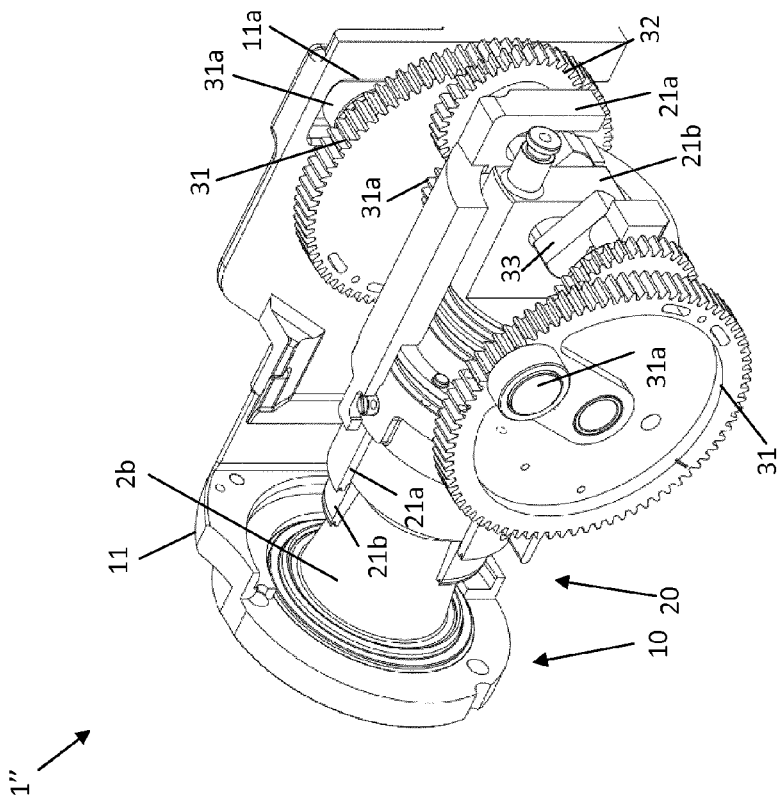
Figure 3B:
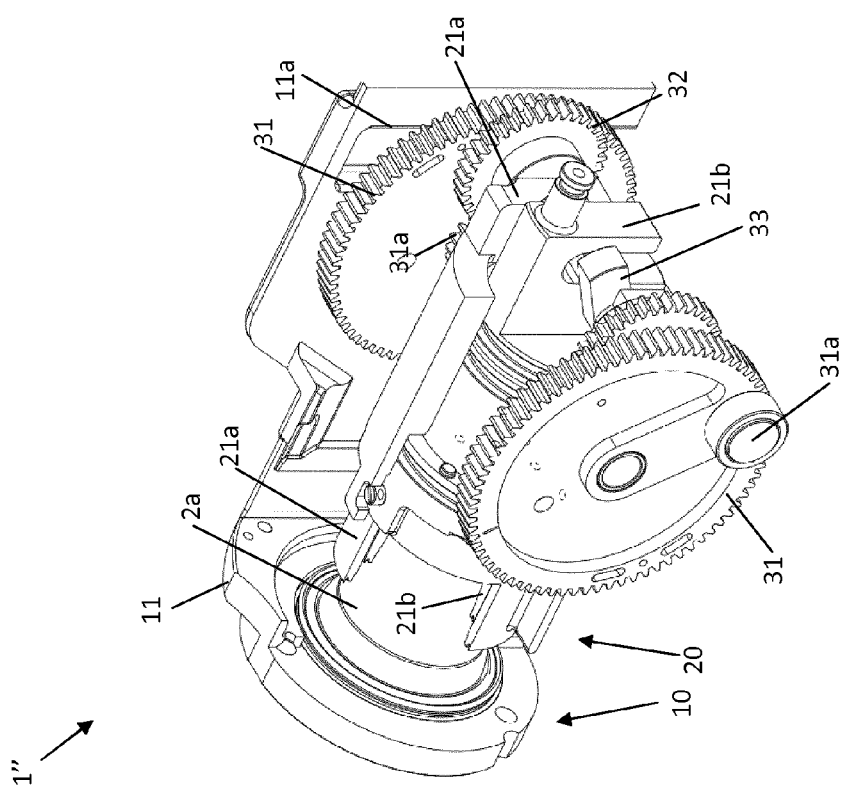
Figure 4B:
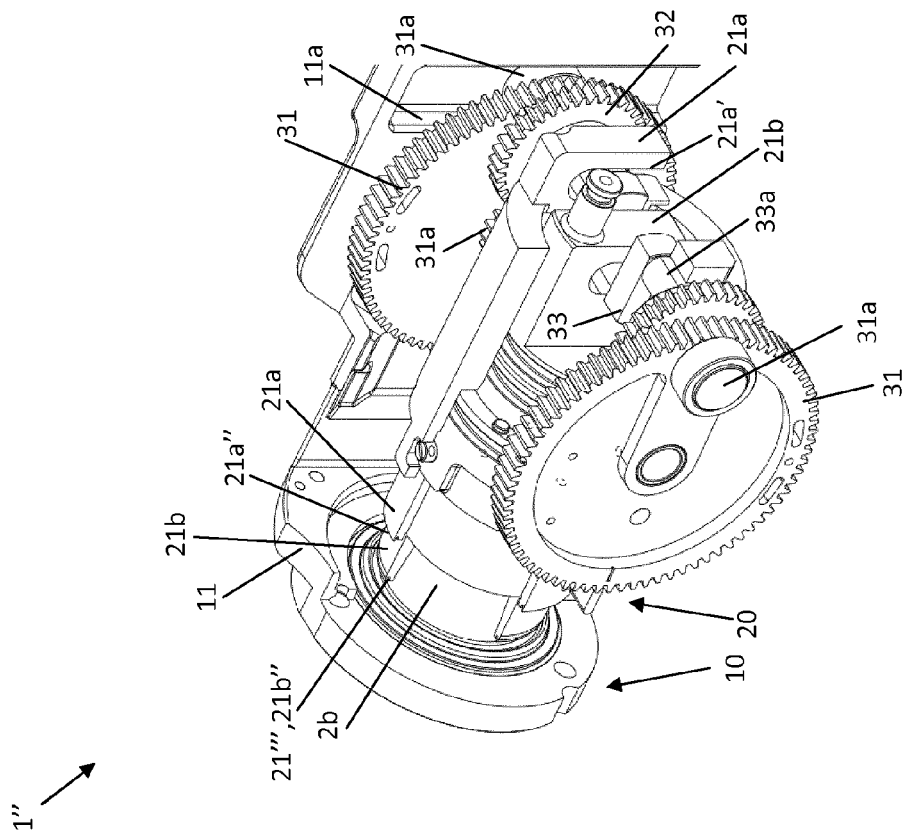
Figure 4A:
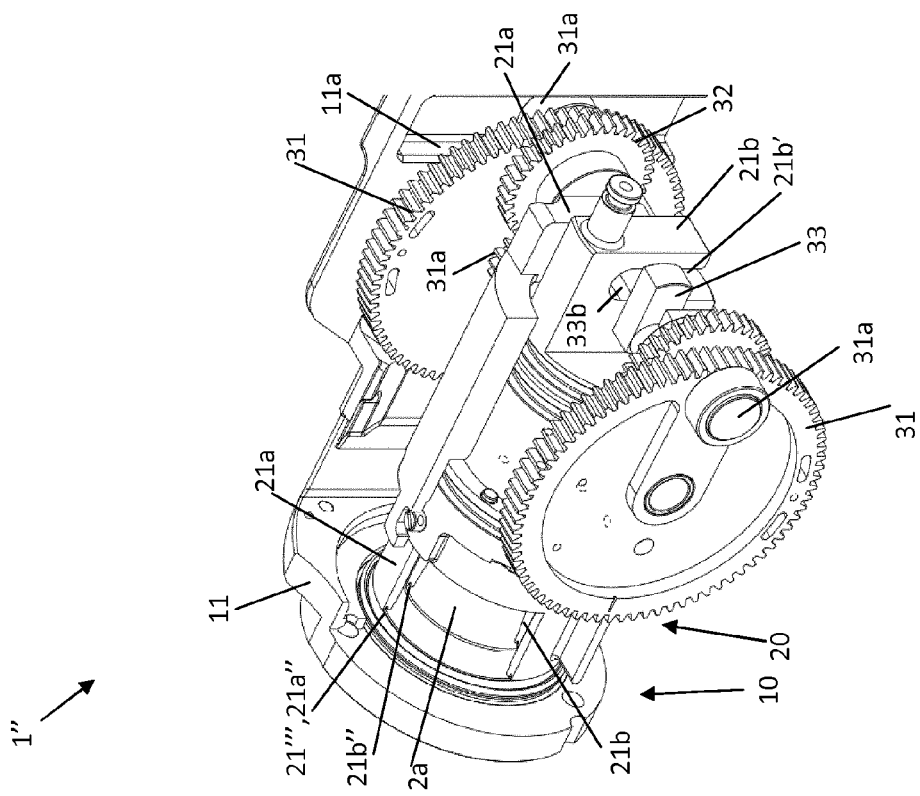
Figure 5B:
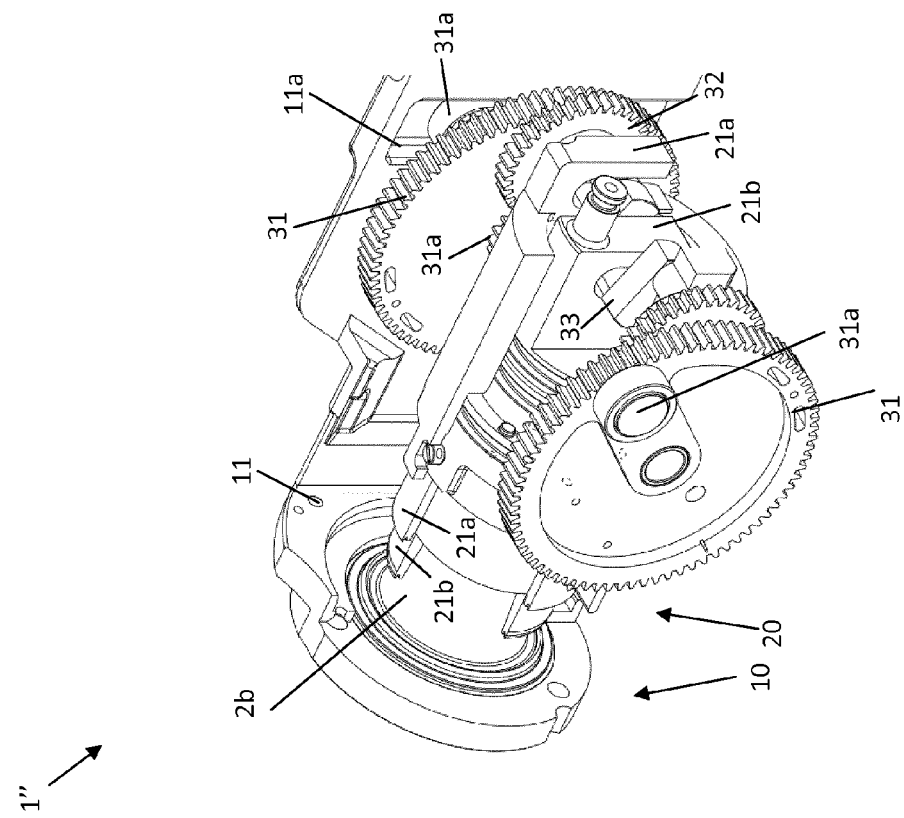
Figure 5A:
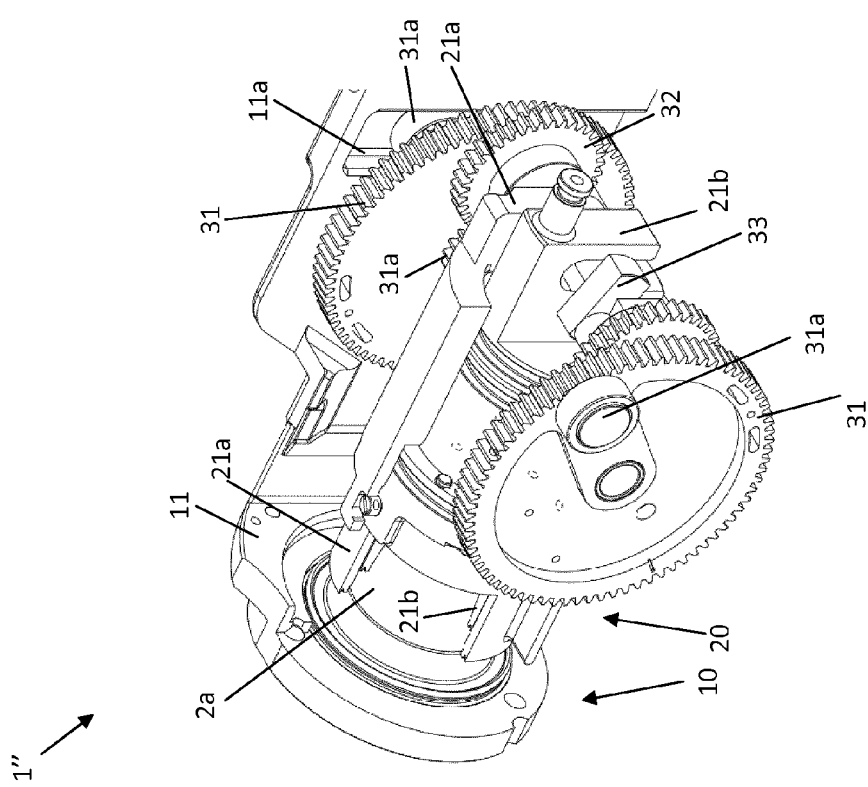

In FIGS. 4a and 4b, part 10 of handling device 1" is in its extraction position with capsule 2a and capsule 2b, respectively in extraction chamber 21" that is thus adjusted to capsule 2a and capsule 2b respectively.

In the particular example illustrated in FIGS. 1a to 4a, wheel 31 is driven counter-clockwise about axis 31' so as to drive part 10 towards the extraction position, e.g. via the downward and then upward movement of element 31a along path 11a. Rotation of wheel 31 relatively drives portions 21a,21b, e.g. via the clockwise movement of member 33,33a,33b (driven by wheel 31) along guiding slots 21a', 21b' of 21a,21b. The effect is to relatively move portion 21a towards part 10 and portion 21b away from part 10 whereby portions 21a,21b are brought into their first relative position, and cavity 21' and thus chamber 21" are expanded.

In the particular example illustrated in FIGS. 1b to 4b, wheel 31 is driven clockwise about axis 31' so as to drive part 10 towards the extraction position, e.g. via the upward and then downward movement of element 31a along path 11a. Rotation of wheel 31 relatively drives portions 21a,21b, e.g. via the counter-clockwise movement of member 33,33a, 33b (driven by wheel 31) along guiding slots 21a',21b' of 21a,21b. The effect is to relatively move portion 21a away from part 10 and portion 21b towards part 10 whereby portions 21a,21b are brought into their second relative position, and cavity 21' and thus chamber 21" are shrunk.

Figures 6A, 6B:
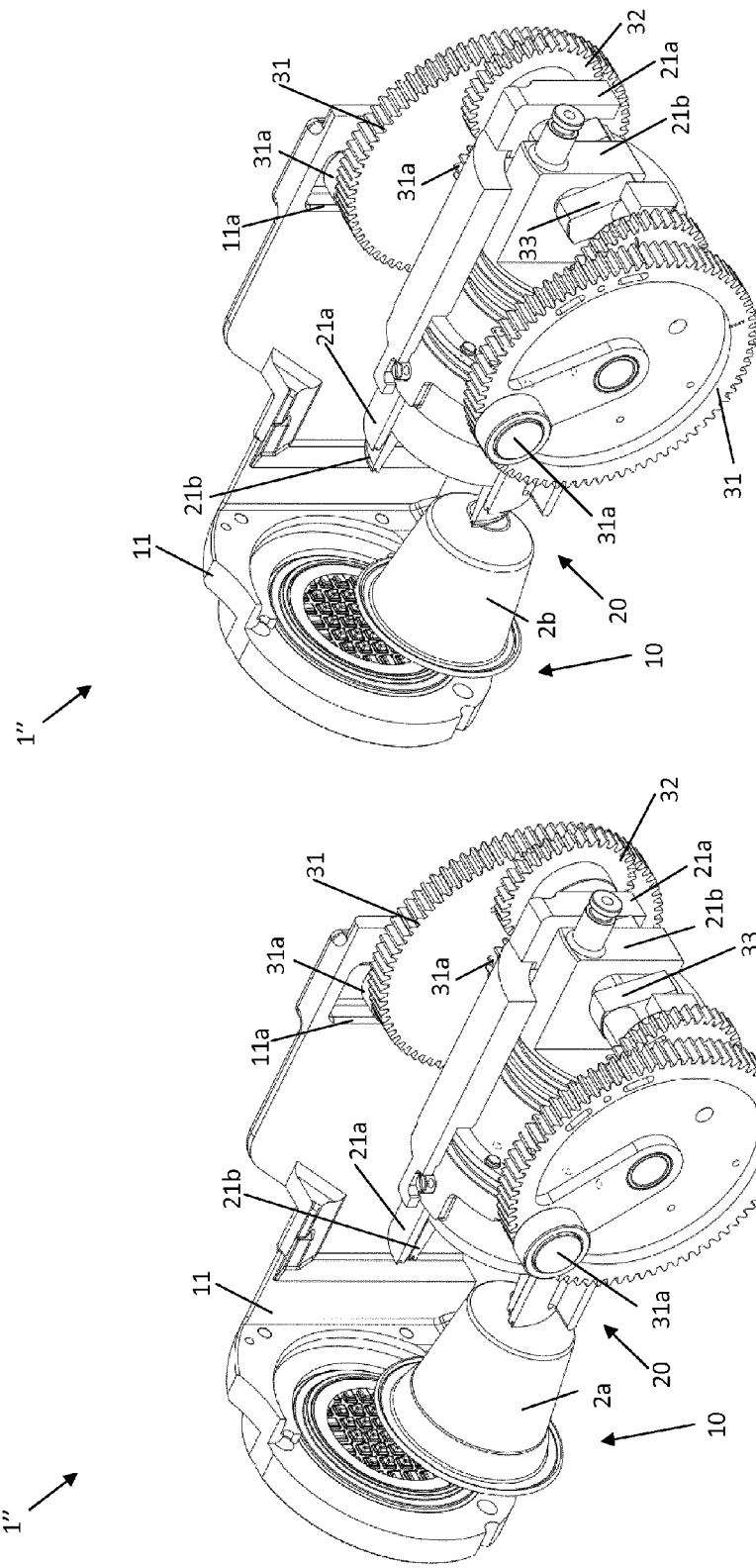

In FIGS. 5a to 7a and 5b to 7b, part 10 is moved from the extraction position to the transfer position whereby capsule 2a,2b is removed from inbetween parts 10,20, e.g. under the effect of gravity (FIGS. 6a and 6b). First and second portions 21a,21b of part 20 are relatively moved from their first and second relative positions, respectively, e.g. to an intermediate relative position (FIGS. 7a and 7b) which may be equal to the intermediate relative position when part 10 is in the transfer position (FIGS. 1a and 1b).

In the particular example illustrated in FIGS. 5a to 7a, wheel 31 is driven counter-clockwise about axis 31' so as to drive part 10 towards the transfer position, e.g. via the upward and then downward movement of member 31a along path 11a. Rotation of wheel 31 relatively drives portions 21a,21b, e.g. via the clockwise movement of element 33,33a,33b (driven by wheel 31) along guiding slots 21a',21b' of portions 21a,21b. The effect is to relatively move portion 21a away from part 10 and portion 21b towards from part 10 whereby portions 21a,21b are moved from their first relative position, e.g. towards an intermediate relative position. Alternatively, wheel 31 could be moved clockwise to simply invert the movement sequence illustrated in FIGS. 1a to 4a.

In the particular example illustrated in FIGS. 5b to 7b, wheel 31 is driven counter-clockwise about axis 31' so as to drive part 10 towards the transfer position, e.g. via the upward and then downward movement of member 31a along path 11a. Rotation of wheel 31 relatively drives portions 21a,21b, e.g. via the clockwise movement of element 33,33a,33b (driven by wheel 31) along guiding slots 21a',21b' of portions 21a,21b. The effect is to relatively move portion 21a towards part 10 and portion 21b away from part 10 whereby portions 21a,21b are moved from their second relative position, e.g. towards an intermediate relative position.

Hence, a capsule 2a,2b, such as a capsule selected from a set of a first capsule 2a having first dimensions 2da,2ha and a second capsule 2b having second dimensions 2db,2hb different to first dimensions 2da,2ha, for instance different first and second capsule diameters 2da,2db and/or different first and second capsule heights 2ha,2hb, can be used for:
  being handled in machine 1;
  implementing a combination of such capsule 2a,2b and machine 1; or
  carrying out a handling method of capsule 2a,2b in machine 1
wherein successively such capsule is:
  immobilized between first and second parts 10,20 when first part 10 is in its transfer position;
  enclosed in extraction chamber 21" formed by moving by actuator 30,300 first part 10 to extraction position, whereby a relative movement of first and second portions 21a,21b of second part 20 between the first and second relative positions can be driven by actuator 30,300; and
  extracted in extraction chamber 21"; and optionally
  removed from extraction chamber 21" by moving first part 10 to the transfer position by actuator 30,300, whereby a relative movement of first and second portions 21a,21b of second part 20 can be driven by actuator 30,300.

The invention claimed is:

1. A machine comprising a frame and a capsule handling member, the capsule handling member comprising:
  a first part that is movable relative to the frame from a transfer position for inserting and/or removing a capsule to an extraction position for extracting the capsule and vice versa;
  a second part that has a capsule receptacle defining a cavity for receiving the capsule and for forming an extraction chamber with the first part in its extraction position, the second part comprising a first portion and a second portion that are relatively movable between a first relative position and a second relative position to change at least one dimension of the cavity and of the extraction chamber; and
  an actuator connected to the first part for driving the movable first part between the transfer position and the extraction position,
  the actuator is connected to the second part for driving the first portion and/or the second portion to relatively move the first and second portions between their first and second relative positions, the capsule handling member further comprises a mechanical transmission connecting the actuator to the first part and to the second part for driving: 1) the first part between the transfer position and the extraction position; and 2) the first portion and/or the second portion of the second part to relatively move the first and second portions between their first and second relative positions.

2. The machine of claim 1, wherein the mechanical transmission comprises:
  a first mechanical transmission for driving the first part between the transfer position and the extraction position; and
  a second mechanical transmission for driving the first portion and/or the second portion of the second part to relatively move the first and second portions between their first and second relative positions.

3. The machine of claim 2, wherein the first mechanical transmission comprises a cam arrangement.

4. The machine of claim 2, wherein the second mechanical transmission comprises at least one of:
  a driving guide member driven by the actuator along a guide path of the second part; and
  a driving member defining a guide path driven by the actuator along a guide member of the second part.

5. The machine of claim 2, wherein the mechanical transmission comprises a common transmission connecting the first mechanical transmission and the second mechanical transmission to the actuator, the common transmission comprising a power divider driven by the actuator.

6. The machine of claim 1, wherein the actuator has a drive output that operates selectively in a first direction and in a second direction different to the first direction.

7. The machine of claim 6, wherein the first part is moved:
  from the transfer position to the extraction position by the actuator irrespectively of the first and second directions of operation of the drive output while the first and second portions of the second part are relatively moved by the actuator either to their first relative position or to their second relative position depending on the direction of operation of the drive output; and/or
  from the extraction position to the transfer position by the actuator irrespectively of the first and second directions of operation of the drive output while the first and second portions of the second part are relatively moved to an intermediate relative position by the actuator either from their first relative position or from their second relative position irrespectively of the first and second directions of operation of the drive output.

8. The machine of claim 1, wherein the machine comprises at least one clutch:
  which is a forward-reverse clutch mounted either between the actuator and the first part or between the actuator and the second part, and
  wherein the first part is moved from the transfer position to the extraction position by the actuator or from the extraction position to the transfer position depending on the direction of operation of the drive output, and
  wherein the first and second portions of the second part are relatively moved by the actuator either to their first relative position or to their second relative position depending on the direction of operation of the drive output, and
  wherein the forward-reverse clutch being arranged to transmit an actuation from the actuator either forward or reversed depending on whether the first and second portions of the second part are to be moved:

to their first relative position or to their second relative position when the first part is to be moved to its extraction position; and from their first relative position or from their second relative position when the first part is to be moved to its transfer position, or which is a decoupling clutch configured to provide a selective coupling and uncoupling between the actuator and the second part, and wherein, when the first part is in its transfer position and is then moved or is then to be moved into its extraction position by the actuator, the first and second portions of the second part being in their first relative position or in their second relative position, the second part being:

coupled to the actuator when the first and second portions are to be moved out of their relative position; or uncoupled from the actuator when the first and second portions are to remain in their relative position, and wherein, when the first part is in its extraction position and is then moved or is then to be moved into its transfer position by the actuator, the first and second portions of the second part being in their first relative position or in their second relative position, the second part being:

coupled to the actuator when the first and second portions are to be moved out of their relative position; or uncoupled from the actuator when the first and second portions are to remain in their relative position.

9. The machine of claim 1, wherein the actuator is an electric motor that is so connected to the movable first part as:

to drive first part from the transfer position to the extraction position in either operating direction and, depending on the operating direction of the motor, to not drive the portions of the second part relatively to one another or to relatively drive the first and second portions to the first relative position or to the second relative position or to an intermediate relative position; and/or to drive the first part from the transfer position to the extraction position in only one operating direction and, depending on a state of a forward-reverse clutch or of a selective coupling/uncoupling clutch between the motor and the second part, to not drive the portions of the second part relatively to one another or to relatively drive the first and second portions to the first relative position or to the second relative position or to an intermediate relative position.

10. The machine of claim 1, wherein the actuator is a user-handle that is operable into:

two different directions to move the first part from the transfer position to the extraction position and, depending on the operating direction of the handle, to not drive the portions of the second part relatively to one another or to relatively drive the first and second portions to the first relative position or the second relative position or to an intermediate relative position; and/or a single direction to move the first part from the transfer position to the extraction position and, depending on a state of a forward-reverse clutch or on a selective coupling/uncoupling clutch between the handle and the second part, to not drive the portions of the second part relatively to one another or to relatively drive the first and second portions to the first relative position or to the second relative position or to an intermediate relative position.

11. The machine of claim 1, wherein the capsule handling member is configured to handle a first capsule of first dimensions as well as a second capsule of second dimensions different to the first dimensions, the first and second portions of the second part defining:

in their first relative position, the cavity and the extraction chamber with first dimensions for receiving and extracting the first capsule; and in their second relative position, the cavity and the extraction chamber with second dimensions for receiving and extracting the second capsule.

12. A combination of a machine comprising a frame, and a capsule handling member comprising: a first part that is movable relative to the frame from a transfer position for inserting and/or removing a capsule to an extraction position for extracting the capsule and vice versa; a second part that has a capsule receptacle defining a cavity for receiving the capsule and for forming an extraction chamber with the first part in its extraction position, the second part comprising a first portion and a second portion that are relatively movable between a first relative position and a second relative position to change at least one dimension of the cavity and of the extraction chamber; and an actuator connected to the first part for driving the movable first part between the transfer position and the extraction position, the actuator is connected to the second part for driving the first portion and/or the second portion to relatively move the first and second portions between their first and second relative positions and a capsule selected from a set of a first capsule having first dimension and a second capsule having a second dimension different from the first dimension and which can both be handled and extracted in the extraction chamber, the capsule handling member further comprises a mechanical transmission connecting the actuator to the first part and to the second part for driving: 1) the first part between the transfer position and the extraction position; and 2) the first portion and/or the second portion of the second part to relatively move the first and second portions between their first and second relative positions.

* * * * *